(12) United States Patent
Krajca et al.

(10) Patent No.: US 11,511,451 B2
(45) Date of Patent: Nov. 29, 2022

(54) AUTOMATED METHOD AND SYSTEM FOR TRIMMING A MULTI-PLY STRUCTURE

(71) Applicant: The Boeing Company, Chicago, IL (US)

(72) Inventors: Scott E. Krajca, Seattle, WA (US); Jeremy E. Justice, Seattle, WA (US)

(73) Assignee: The Boeing Company, Chicago, IL (US)

( * ) Notice: Subject to any disclaimer, the term of this patent is extended or adjusted under 35 U.S.C. 154(b) by 440 days.

(21) Appl. No.: 16/778,055

(22) Filed: Jan. 31, 2020

(65) Prior Publication Data
US 2021/0237301 A1    Aug. 5, 2021

(51) Int. Cl.
*B26D 7/08*    (2006.01)
*B26D 7/01*    (2006.01)
*B26D 7/18*    (2006.01)

(52) U.S. Cl.
CPC ............... *B26D 7/086* (2013.01); *B26D 7/01* (2013.01); *B26D 7/18* (2013.01)

(58) Field of Classification Search
CPC .................................. B26D 7/00; B26D 7/084
See application file for complete search history.

(56) References Cited

U.S. PATENT DOCUMENTS

| 3,788,179 | A | * | 1/1974 | Vallier ............... B26F 1/405 83/563 |
| 5,480,508 | A | | 1/1996 | Manabe et al. |
| 7,879,177 | B2 | | 2/2011 | McCowin et al. |
| 2008/0083308 | A1 | | 4/2008 | Evans et al. |

FOREIGN PATENT DOCUMENTS

| DE | 41 30 269 | 3/1992 |
| DE | 20 2017105285 | 11/2018 |
| EP | 3 530 440 | 8/2019 |
| WO | WO 2013/017796 | 2/2013 |

OTHER PUBLICATIONS

European Patent Office, Extended European Search Report, App. No. 21152467.3 (Jun. 16, 2021).

* cited by examiner

*Primary Examiner* — Jennifer S Matthews
(74) *Attorney, Agent, or Firm* — Walters & Wasylyna LLC

(57) ABSTRACT

Provided is an automated method for trimming a multi-ply structure having at least a first ply and a second ply, where the method includes applying the first ply over a platen, positioning a cutting board over a protected portion of the first ply, applying the second ply over the platen such that the cutting board is between the protected portion of the first ply and a superjacent portion of the second ply, and cutting the superjacent portion of the second ply.

20 Claims, 16 Drawing Sheets

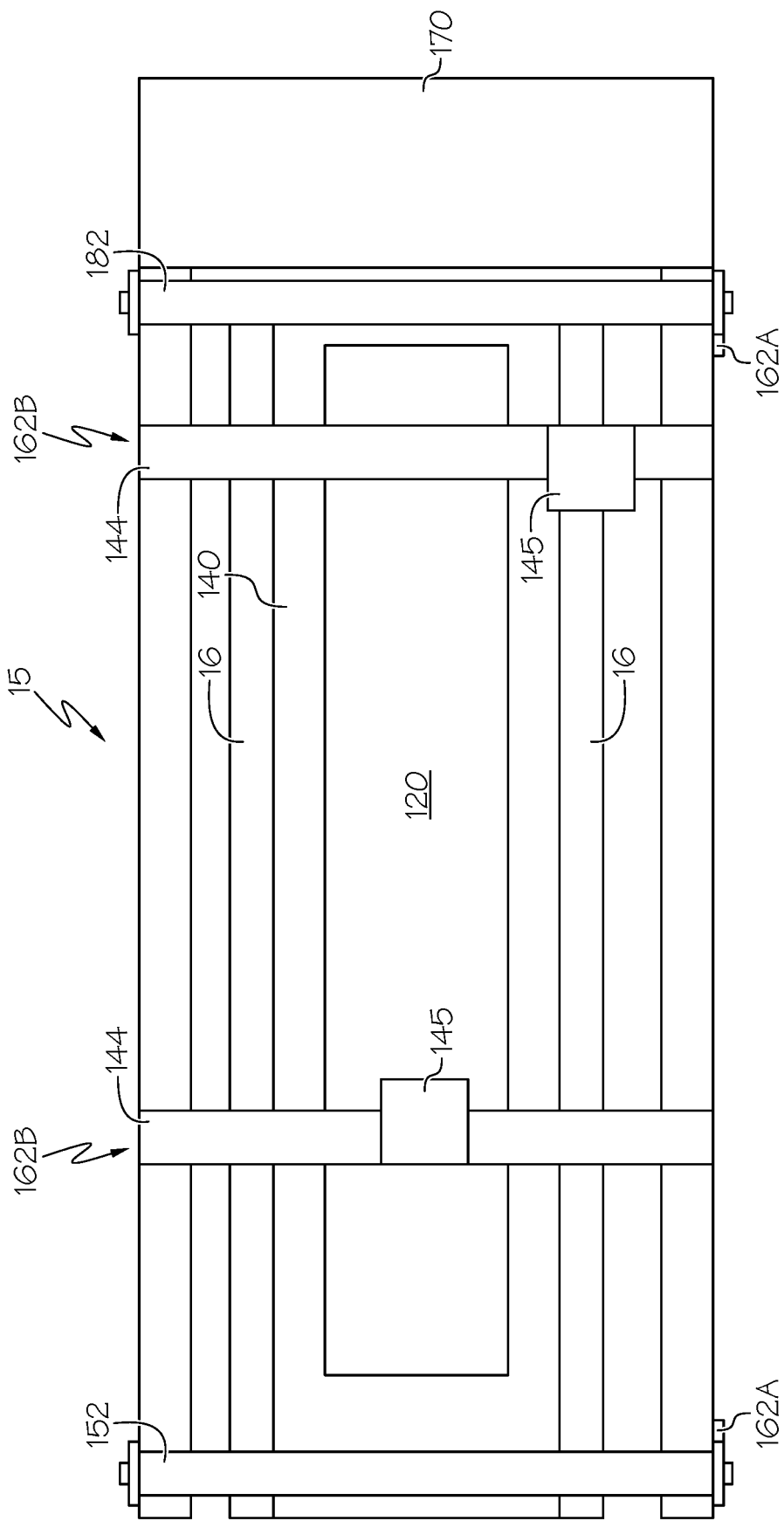

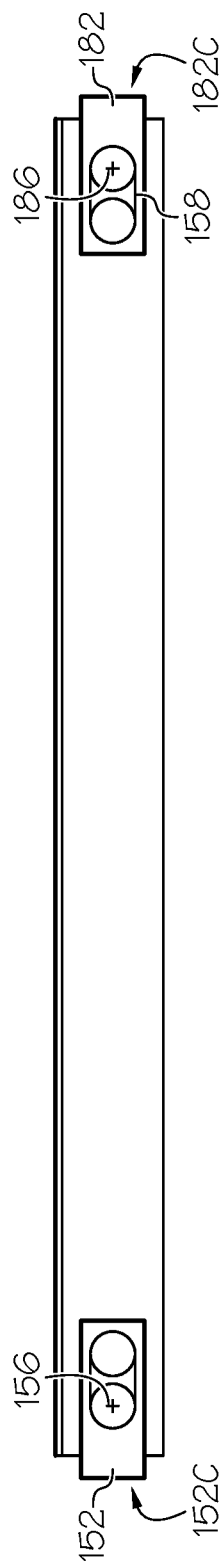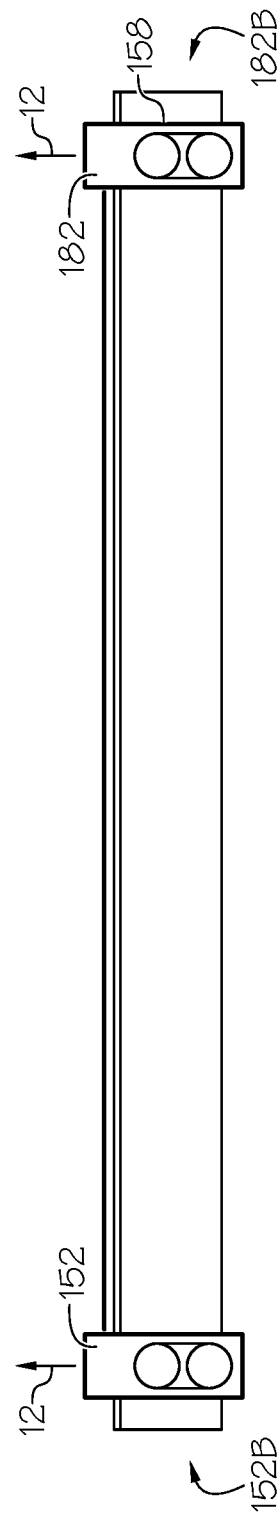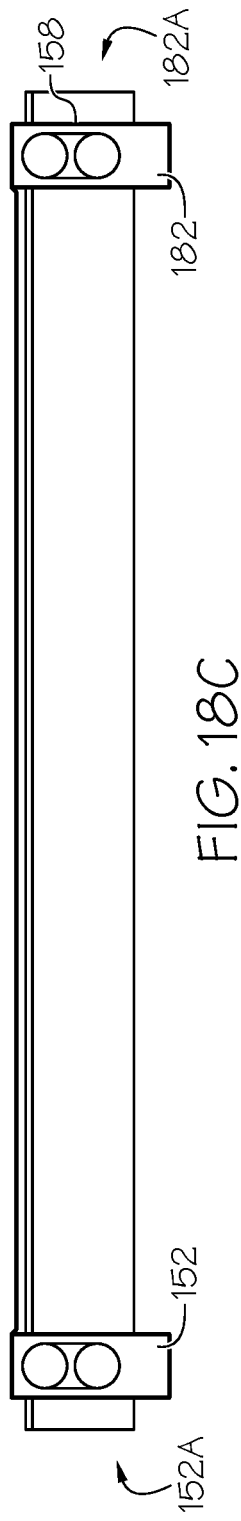
FIG. 18A
FIG. 18B
FIG. 18C

AUTOMATED METHOD AND SYSTEM FOR TRIMMING A MULTI-PLY STRUCTURE

FIELD

The present disclosure is generally related to composite structures and, more particularly, to apparatus and methods for forming composite materials. Still more particularly, the present application is related to apparatus and methods related to forming a multi-ply structure and trimming a multi-ply structure.

BACKGROUND

Composite structures are widely used as high-strength, low-weight materials to replace metals, such as in aerospace applications. A composite structure (e.g., a composite laminate) is formed by one or more composite layers (also referred to as plies or lamina). Each composite layer includes a reinforcement material and a matrix material. The reinforcement material may include fibers. The fibers may be oriented in a single direction (e.g., unidirectional) or in two directions (e.g., bi-directional). The matrix material may include a resin.

Bundles of fibers may be laid up in layers to form a reinforcement layup, such as a preform. The resin is infused within spaces defined between the fiber bundles of the preform to form an integrated preform. The preform may be referred to as a wet preform (or a prepreg) when the fiber bundles have been pre-impregnated with resin or a dry preform when no resin is present. The integrated preform may be partially cured or fully cured to form the composite structure. One example of a composite structure is a carbon fiber-reinforced polymer.

It is desirable to trim or cut the plies being laid up to form a preform. It is also desirable to trim or cut the plies being laid up to form a preform though an automated process and/or automated system. Existing automated processes and/or automated systems only address trimming a single ply at a time or an entire laminate thickness. No solutions currently address differentially trimming the components of a multi-ply structure simultaneously.

Accordingly, those skilled in the art continue with research and development efforts in the field of automated methods and systems for trimming a multi-ply structure.

SUMMARY

One example of the disclosed automated method for trimming a multi-ply structure having at least a first ply and a second ply includes applying the first ply over a platen, positioning a cutting board over a protected portion of the first ply, applying the second ply over the platen such that the cutting board is between the protected portion of the first ply and a superjacent portion of the second ply, and cutting the superjacent portion of the second ply.

One example of the disclosed automated method for trimming a multi-ply structure having at least a first ply having a first composite material and a second ply having a second composite material includes positioning a film over a platen, positioning a cutting board over a protected portion of the film, applying with a laminator the first ply over the platen such that the cutting board is between the protected portion of the film and a superjacent portion of the first ply, cutting the superjacent portion of the first ply, positioning the cutting board over a protected portion of the first ply, applying with the laminator the second ply over the platen such that the cutting board is between the protected portion of the first ply and a superjacent portion of the second ply, cutting the superjacent portion of the second ply.

One example of the disclosed automated multi-ply structure trimming system includes a platen, a laminator movable relative to the platen to apply at least a first ply and a second ply over the platen, a cutting board moveable relative to the platen and positionable between the first ply and the second ply, and a cutting tool movable with respect to the platen to cut the second ply.

Other examples of the disclosed apparatus and methods will become apparent from the following detailed description, the accompanying drawings and the appended claims.

BRIEF DESCRIPTION OF THE DRAWINGS

FIG. 13 is a top view of a second example of an automated multi-ply structure trimming system in a first configuration.

FIG. 18A is a front view of a platen with a set of cutting boards in a first configuration.

FIG. 18B is a front view of a platen with a set of cutting boards in a second configuration.

FIG. 18C is a front view of a platen with a set of cutting boards in a third configuration.

DETAILED DESCRIPTION

Figure 1:
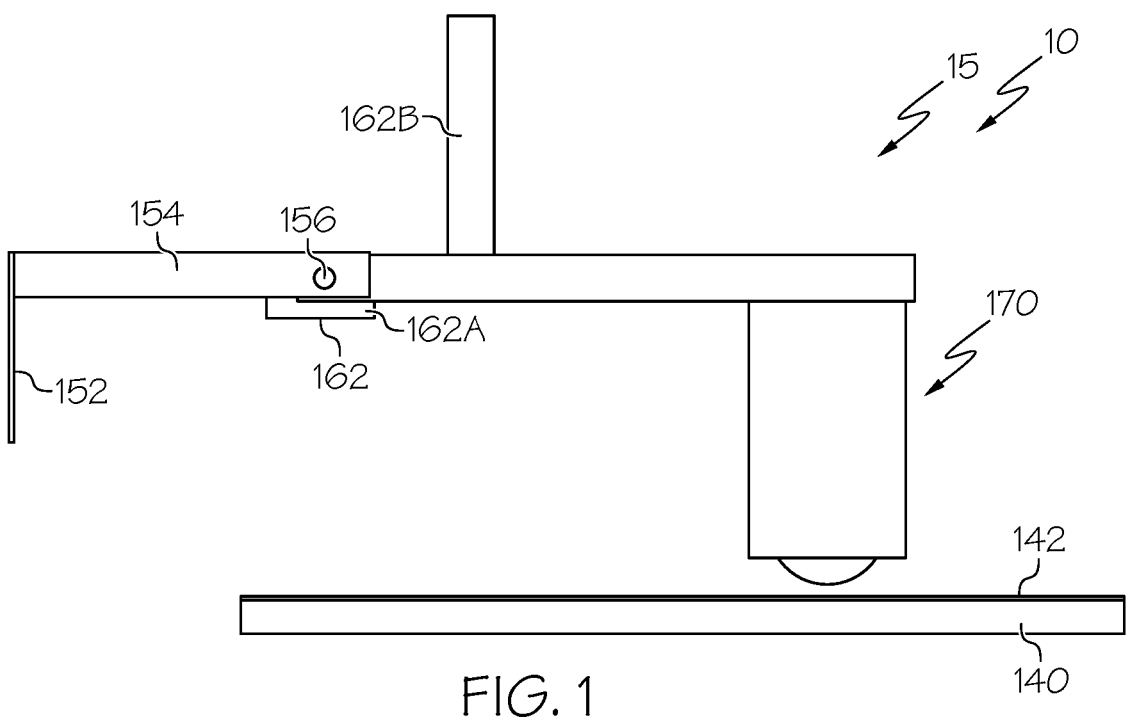
FIG. 1 is a front view of a first example of an automated multi-ply structure trimming system in a first configuration.

The following detailed description refers to the accompanying drawings, which illustrate specific non-limiting examples of the disclosure. Other examples having different structures and operations do not depart from the scope of the present disclosure. Like reference numerals may refer to the same element or component in the different drawings.

FIGS. 1-10 illustrate a first non-limiting example of an automated multi-ply structure trimming system (15). The automated multi-ply structure trimming system (15) includes a platen (140); a laminator (170) movable or stationary relative to the platen (140) to apply at least a first ply (120) (see FIG. 3) and a second ply (130) (see FIG. 8) over the platen (140); a cutting board (152) moveable relative to the platen (140) and positionable between the first ply (120) and the second ply (130) (see FIG. 8); and a cutting tool (160) (see FIG. 4) movable with respect to the platen (140) to cut the second ply (130).

In some examples, the platen (140) includes any form or geometry chosen with good engineering judgment. In some examples, the platen (140) is planar or substantially planar. In other acceptable examples, the platen (140) is not planar. In some acceptable examples, the platen (140) is contoured. In some examples, the platen (140) is movable with respect to one or more other components described for use in the methods and systems described herein. In some examples, the platen (140) is configured to be movable by some automated actuator. As described further below, in some examples, the platen (140) is movable with respect to one or more workstations (10).

In some examples, the application of the first ply (120) over the platen (140) is such that the first ply (120) is in direct contact with the platen (140). An acceptable alternative is that application of the first ply (120) over the platen (140) is such that the first ply (120) is not in direct contact with the platen (140) but rather is in indirect contact with platen (140) through a film (142) or other intermediary material. The film (142) will be addressed further below. In some examples, the application of the second ply (130) over the platen (140) is such that at least part of the second ply (130) is in direct contact with the platen (140). An acceptable alternative is that application of the second ply (130) over the platen (140) is such that at least part of the second ply (130) is not in direct contact with the platen (140) but rather is in indirect contact with platen (140) through a film (142) or the first ply (120) other intermediary material.

Figure 12A:
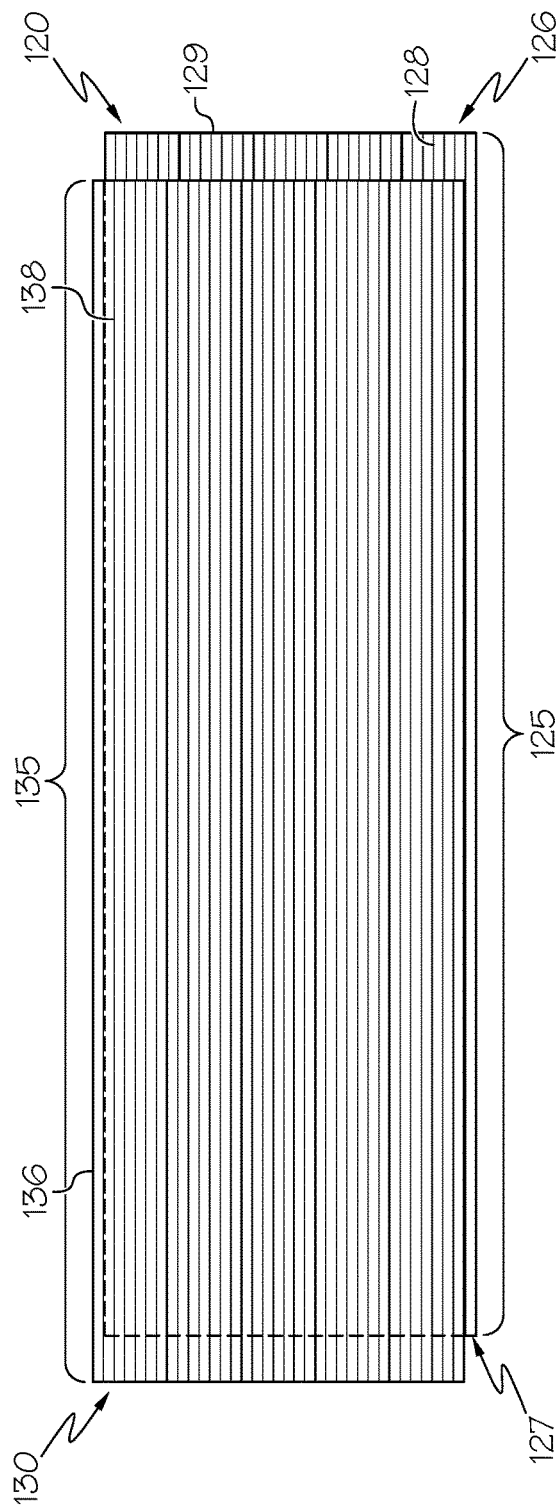
FIG. 12A is a top view of a first example of a multi-ply structure prior to trimming.
Figure 12B:
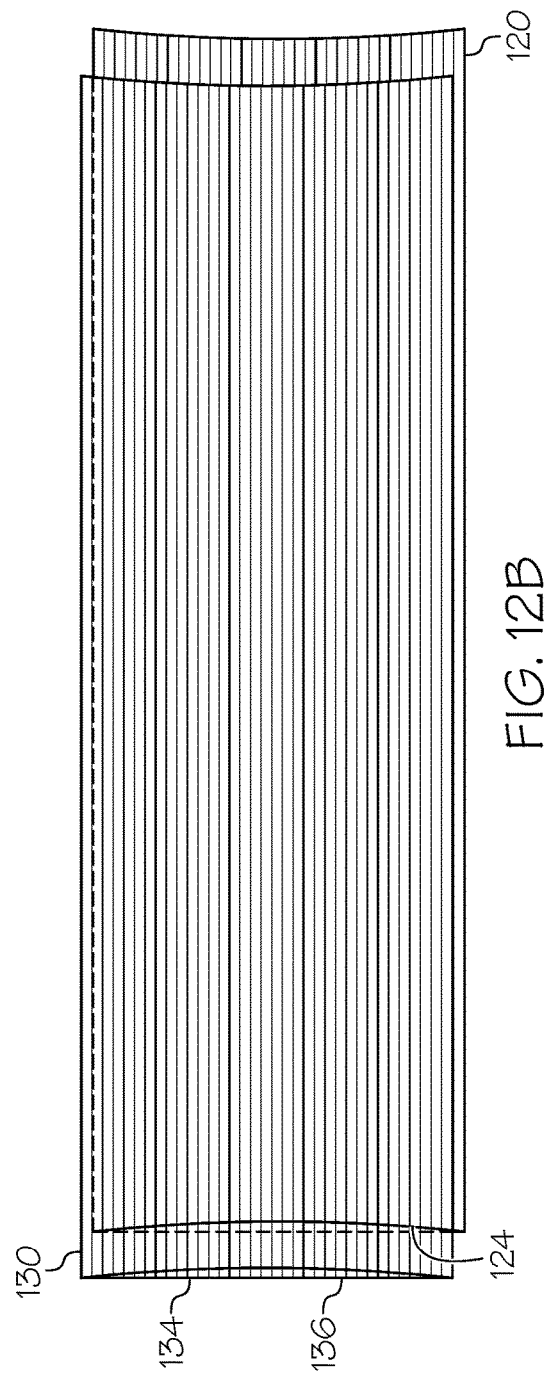
FIG. 12B is a top view of the first example of a multi-ply structure after trimming.

Referring now to FIGS. 12A and 12B, in some non-limiting examples, the first ply (120) and the second ply (130) are staggered or positioned such that the second ply (130) does not fully overlay the first ply (120) at all points. In some non-limiting examples, like those shown in FIGS. 12A and 12B, the first ply (120) at least partly overlies a film (142) on the platen (140), and the second ply (130) partially overlies the first ply (120) and partially overlies the platen (140) and/or the film (142) on the platen (140).

The laminator (170) includes any sort of laminator (170) chosen with good engineering judgment. Some optional examples comprise multiple laminators (170). The laminator (170) is movable or stationary with respect to one or more other components described for use in the methods and systems described herein. In some examples, the laminator (170) is configured to be movable by some automated actuator (162). In some examples, the laminator (170) is movable with respect to the platen (140) and the cutting board (152). In some optional examples, the laminator (170) is stationary with respect to the platen (140) and cutting board (152). In some optional examples, there are multiple laminators (170) with a 0 degree laminator (170) being stationary, and the platen (140) moveable with respect to the 0 degree laminator (170) to pay out a material for a first ply (120) or a second ply (130); and, a movable 45 degree laminator (170), or a movable 90 degree laminator (170), or both a movable 45 degree laminator (170) and a movable 90 degree laminator (170).

Figure 10:
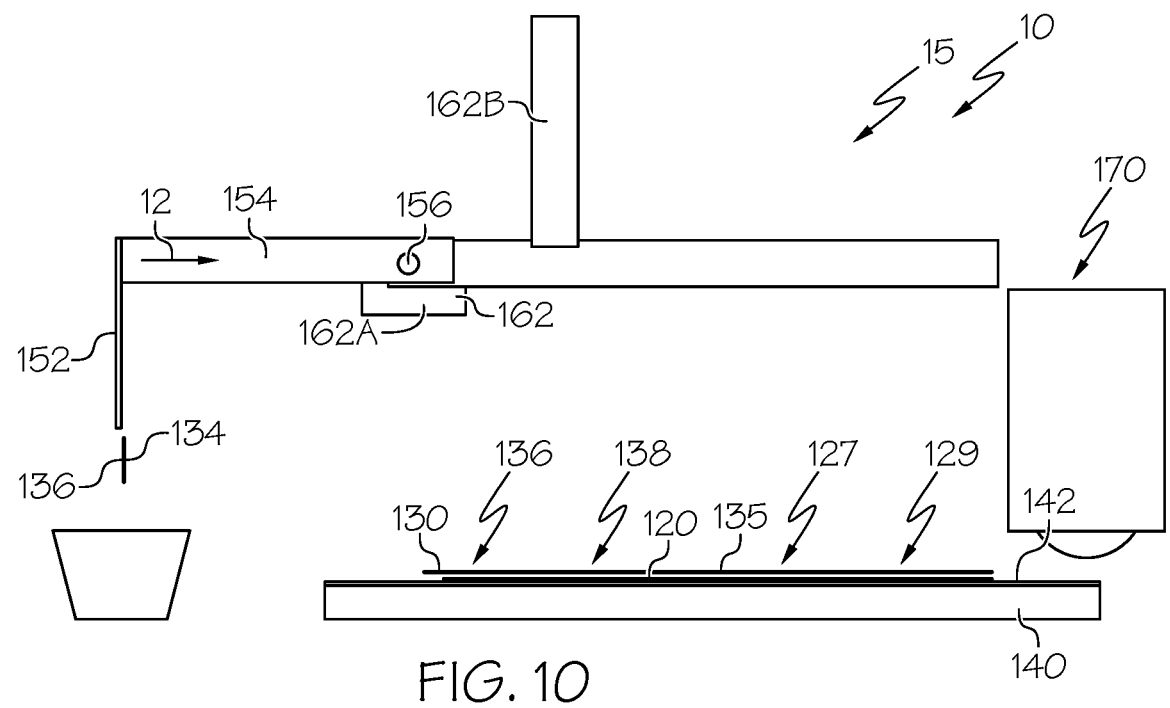
FIG. 10 is a front view of the first example of an automated multi-ply structure trimming system in a tenth configuration.

The cutting board (152) is selectably movable and positionable to protect from cutting a subjacent component or material such as, by way of example, the platen (140), the film (142), the first ply (120) or the second ply (130). The system comprises one, two, three, or more cutting boards (152) in some non-limiting examples. The cutting board (152) is configured to be moveable relative to the platen (140) about an axis of rotation (156). In other non-limiting examples, the cutting board (152) is configured to be moveable relative to the platen (140) by translation, or by some combination of translation and rotation. In some non-limiting examples, as shown in FIG. 10, the axis of rotation (156) is perpendicular to at least one imaginary vector (12) normal to the cutting board (152). In some non-limiting examples, the axis of rotation (156) is parallel to at least one imaginary vector normal to the cutting board (152). In some examples, the axis of rotation (156) is fixed in space relative to the cutting board (152), but this is not always the case in every example.

Figure 11C:
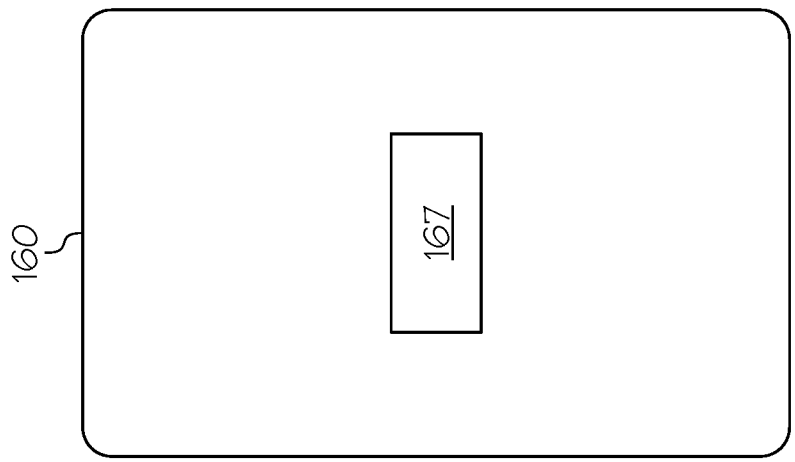
FIG. 11C is a block diagram of one example of a cutting tool comprising a wheel cutter.
Figure 11B:
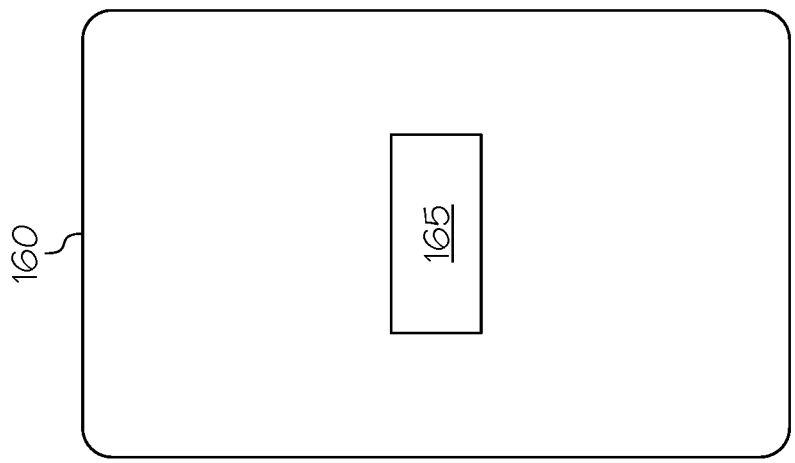
FIG. 11B is a block diagram of one example of a cutting tool comprising a mechanical knife.
Figure 11A:
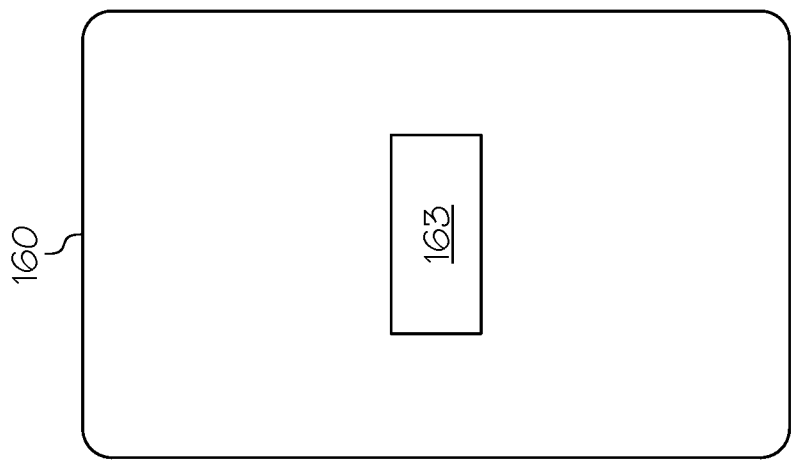
FIG. 11A is a block diagram of one example of a cutting tool comprising an ultrasonic knife.

With continued reference to FIGS. 1-10, in some examples the cutting tool (160) is movable with respect to the platen (140) and able to cut the first ply (120), or the second ply (130), or the second ply (130) and the first ply (120), or some other set of plies. In some examples, the cutting tool (160) is unable to cut the cutting board (152). In some examples, the cutting tool (160) is able to cut the cutting board (152) only very slightly or slowly, such that the cutting board (152) is only cut slightly by any given cutting operation and will last for many cutting operations. In some examples, the cutting board (152) will last for at least two cutting operations. In some examples, the cutting tool (160) is unable to cut the second cutting board (182). In some examples, the cutting tool (160) is able to cut the second cutting board (182) only very slightly or slowly, such that the second cutting board (182) is only cut slightly by any given cutting operation and will last for many cutting operations. In some examples, the second cutting board (182) will last for at least two cutting operations. In some examples during a cutting operation the cutting tool (160) will be in contact with the cutting board and cut all the way through the composite material in a single pass. As shown in FIGS. 11A-11C, in some examples, the cutting tool (160) will comprise at least one of an ultrasonic knife (163), a mechanical knife (165), and a wheel cutter (167). In other non-limiting examples, the cutting tool (160) is some other kind of tool that does not comprise any of an ultrasonic knife (163), a mechanical knife (165), or a wheel cutter (167). In some examples, the cutting tool (160) is operated to cut a portion of a material over the cutting board (152), these latter portions are each be referred to as a superjacent portion, while leaving a protected portion (20) under the cutting board (152) uncut.

With continued reference to FIGS. 1-10, in some examples, the system (15) optionally comprises a film (142) positioned over the platen (140). In such examples, the platen (140) supports the film (142) positioned over the platen (140). In other non-limiting examples, the system (15) does not comprise a film (142) positioned over the platen (140) or the platen (140) does not support a film (142) positioned over the platen (140). In some examples, the film (142) is in direct contact with the platen (140). In some examples, the film (142) is in indirect contact with the platen (140). In some examples, the film (142) is release paper or some other material adapted to facilitate removal of the first ply (120), or another ply or material, from the platen (140).

With continued reference to FIGS. 1-10, in some examples, the system (15) further comprises a scrap bin (16) (see FIG. 5) positioned to receive scrap (134) generated from the first ply (120) and/or second ply (130). In some examples, the system (15) comprises no scrap bin (16), one scrap bin (16), two scrap bins (16), or more scrap bins (16). A scrap bin (16) is adapted and/or positioned to receive discarded first scrap (124) from the first ply (120) or to receive discarded second scrap (134) generated from the second ply (130), or to receive discarded scrap from another ply, or a combination thereof.

With continued reference to FIGS. 1-10, in some examples, the system (15) further comprises one or more automated actuators. In some examples, the system (15) comprises an automated actuator (162) operationally associated with the platen (140) and adapted to move the platen (140); an automated actuator (162) operationally associated with the laminator (170) and adapted to move the laminator (170); an automated actuator (162A) operationally associated with the cutting board (152) and adapted to move the cutting board (152); or some combination thereof. In some examples, the system (15) comprises an automated actuator (162B) operationally associated with the cutting tool (160), such that the automated actuator (162B) is adapted to move the cutting tool (160) to perform a cutting operation. In certain aspects, an actuator (162) is electromagnetic, pneumatic, hydraulic, or otherwise as chosen with good engineering judgment.

FIGS. 11A-11C illustrate differing non-limiting examples of a cutting tool.

FIGS. 12A-12B illustrate differing ply arrangement patterns and how such may be trimmed.

FIGS. 13-23 illustrate a second non-limiting example of an automated multi-ply structure trimming system (15). The automated multi-ply structure trimming system (15) includes a platen (140); a laminator (170) movable or stationary relative to the platen (140) to apply at least a first ply (120) (see FIG. 15) and a second ply (130) (see FIG. 8) over the platen (140); a cutting board (152) moveable relative to the platen (140) and positionable between the first ply (120) and the second ply (130) (see FIG. 16); a second cutting board (182) moveable relative to the platen (140) and positionable between the first ply (120) and the second ply (130) (see FIG. 16); and a first cutting tool (160) and second cutting tool (169) each movable with respect to the platen (140) to cut the second ply (130).

In some aspects of the second non-limiting example, the platen (140) includes any form or geometry chosen with good engineering judgment. In some examples, the platen (140) is planar or substantially planar. In other acceptable examples, the platen (140) is not planar. In some acceptable examples, the platen (140) is contoured. In some examples, the platen (140) is movable with respect to one or more other components described for use in the methods and systems described herein. In some examples, the platen (140) is configured to be movable by some automated actuator (162). As described further below, in some examples, the platen (140) is movable with respect to one or more workstations (10).

In some aspects of the second non-limiting example, the application of the first ply (120) over the platen (140) is such that the first ply (120) is in direct contact with the platen (140). An acceptable alternative is that application of the first ply (120) over the platen (140) is such that the first ply (120) is not in direct contact with the platen (140) but rather is in indirect contact with platen (140) through a film (142) or other intermediary material. The film (142) will be addressed further below. In some examples, the application of the second ply (130) over the platen (140) is such that at least part of the second ply (130) is in direct contact with the platen (140). An acceptable alternative is that application of the second ply (130) over the platen (140) is such that at least part of the second ply (130) is not in direct contact with the platen (140) but rather is in indirect contact with platen (140) through a film (142) or the first ply (120) other intermediary material.

In some aspects of the second non-limiting example, the laminator (170) includes any sort of laminator (170) chosen with good engineering judgment. Some optional examples comprise multiple laminators (170). The laminator (170) is movable or stationary with respect to one or more other components described for use in the methods and systems described herein. In some examples, the laminator (170) is configured to be movable by some automated actuator (162). In some examples, the laminator (170) is movable with respect to the platen (140), the cutting board (152), and the second cutting board (182). In some optional examples, the laminator (170) is stationary with respect to the platen (140) the cutting board (152), and the second cutting board (182). In some optional examples, there are multiple laminators (170) with a 0 degree laminator (170) being stationary, and the platen (140) moveable with respect to the 0 degree laminator (170) to pay out a material for a first ply (120) or a second ply (130); and, a movable 45 degree laminator (170), or a movable 90 degree laminator (170), or both a movable 45 degree laminator (170) and a movable 90 degree laminator (170).

In some aspects of the second non-limiting example, the cutting board (152) is selectably movable and positionable to protect from cutting a subjacent component or material such as, by way of example, the platen (140), the film (142), the first ply (120) or the second ply (130). The cutting board (152) is configured to be moveable relative to the platen (140) about an axis of rotation (156) and to be moveable relative to the platen (140) by translation. As shown in FIGS. 18A-18C, the axis of rotation (156) is perpendicular to at least one imaginary vector (12) normal to the cutting board (152). In some non-limiting examples, the axis of rotation (156) is parallel to at least one imaginary vector normal to the cutting board (152). In some examples, the axis of rotation (156) is fixed in space relative to the cutting board (152), but this is not always the case in every example.

In some examples of the second non-limiting example, the second cutting board (182) is selectably movable and positionable to protect from cutting a subjacent component or material such as, by way of example, the platen (140), the film (142), the first ply (120) or the second ply (130). The second cutting board (182) is configured to be moveable relative to the platen (140) about a second axis of rotation (186) and to be moveable relative to the platen (140) by translation. As shown in FIGS. 18A-18C, the second axis of rotation (186) is perpendicular to at least one imaginary vector (12) normal to the second cutting board (182). In some non-limiting examples, the second axis of rotation (186) is parallel to at least one imaginary vector normal to the second cutting board (182). In some examples, the second axis of rotation (186) is fixed in space relative to the second cutting board (182), but this is not always the case in every example.

With continued reference to FIGS. 13-23, in some examples, the cutting tool (160) and the second cutting tool (169) are each movable with respect to the platen (140) and are each able to cut the first ply (120), or the second ply (130), or the second ply (130) and the first ply (120), or some other set of plies. In some examples, the cutting tool (160) is unable to cut the cutting board (152). In some examples, the cutting tool (160) and the second cutting tool (169) are each able to cut either the cutting board (152) or the second cutting board (182) only very slightly or slowly, such that the cutting board (152) or the second cutting board (182) is only cut slightly by any given cutting operation and will last for many cutting operations. In some examples, the cutting board (152) and the second cutting board (182) will each last for at least two cutting operations. In some examples during a cutting operation the cutting tool (160) will be in contact with the cutting board (152) and will cut all the way through the composite material in a single pass. In some examples during a cutting operation the second cutting tool (169) will be in contact with the second cutting board (182) and cut all the way through the composite material in a single pass. In some examples, the cutting tool (160) is operated to cut a portion of a material over the cutting board (152), these latter portions are each be referred to as a superjacent portion, while leaving a protected portion (20) under the cutting board (152) uncut. In some examples, the second cutting tool (169) is operated to cut a portion of a material over the second cutting board (182), these latter portions are each be referred to as a superjacent portion, while leaving a protected portion (20) under the second cutting board (182) uncut.

Figure 14:
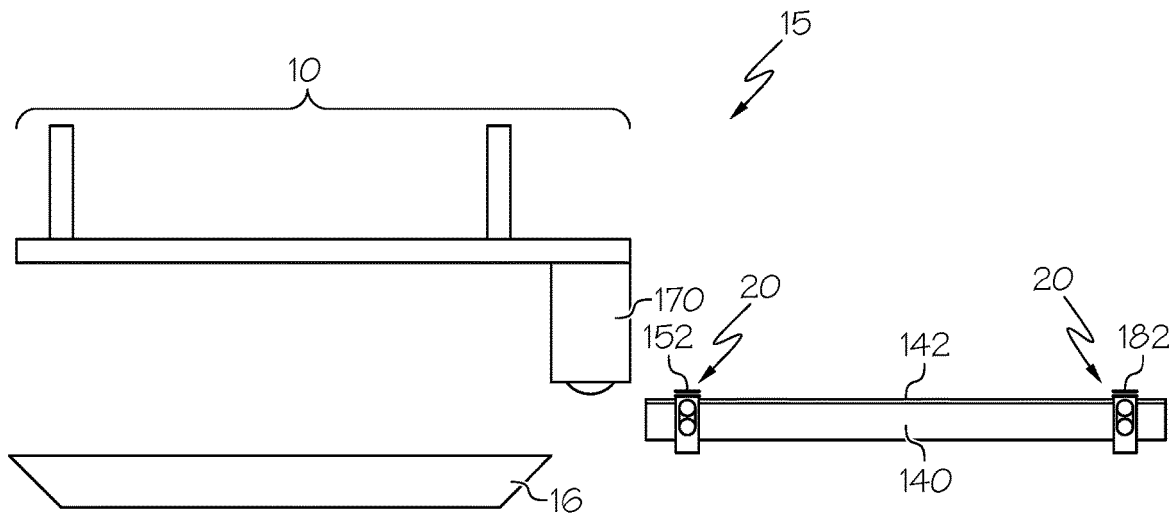
FIG. 14 is a front view of a second example of an automated multi-ply structure trimming system in a second configuration.
Figure 15:
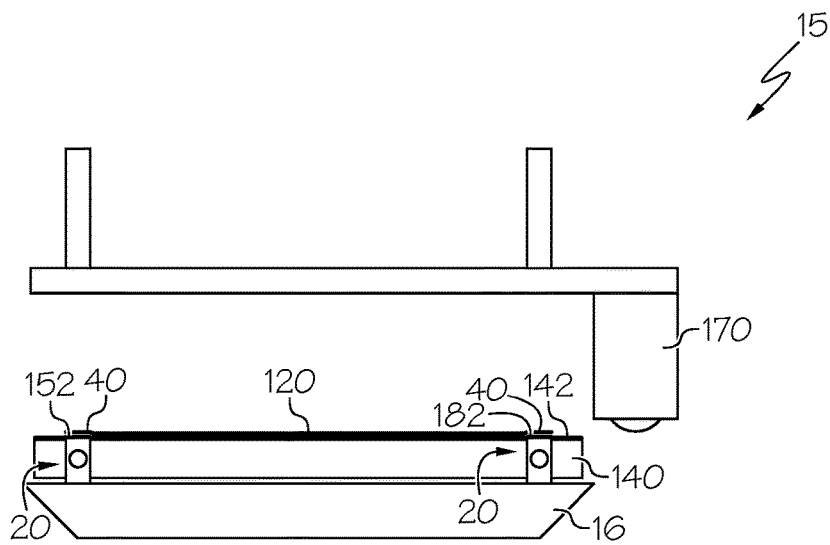
FIG. 15 is a front view of a second example of an automated multi-ply structure trimming system in a third configuration.

With continued reference to FIGS. 13-23, and particularly FIGS. 14 and 15, in some examples, the system (15) optionally comprises a film (142) positioned over the platen (140). In such examples, the platen (140) supports the film (142) positioned over the platen (140). In other non-limiting examples, the system (15) does not comprise a film (142) positioned over the platen (140) or the platen (140) does not support a film (142) positioned over the platen (140). In some examples, the film (142) is in direct contact with the platen (140). In some examples, the film (142) is in indirect contact with the platen (140). In some examples, the film (142) is release paper or some other material adapted to facilitate removal of the first ply (120), or another ply or material, from the platen (140).

Figure 21:
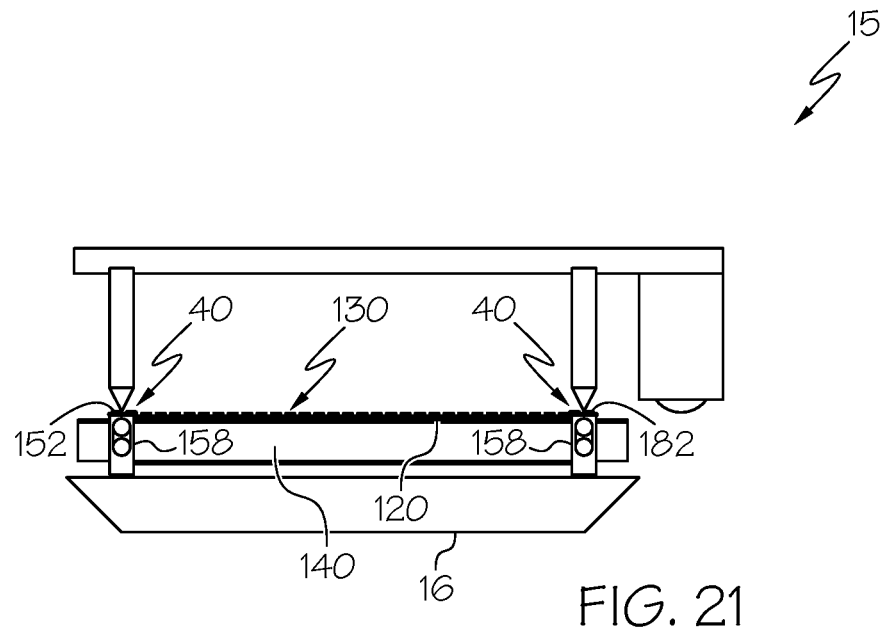
FIG. 21 is a front view of a second example of an automated multi-ply structure trimming system in an eighth configuration.
Figure 22:
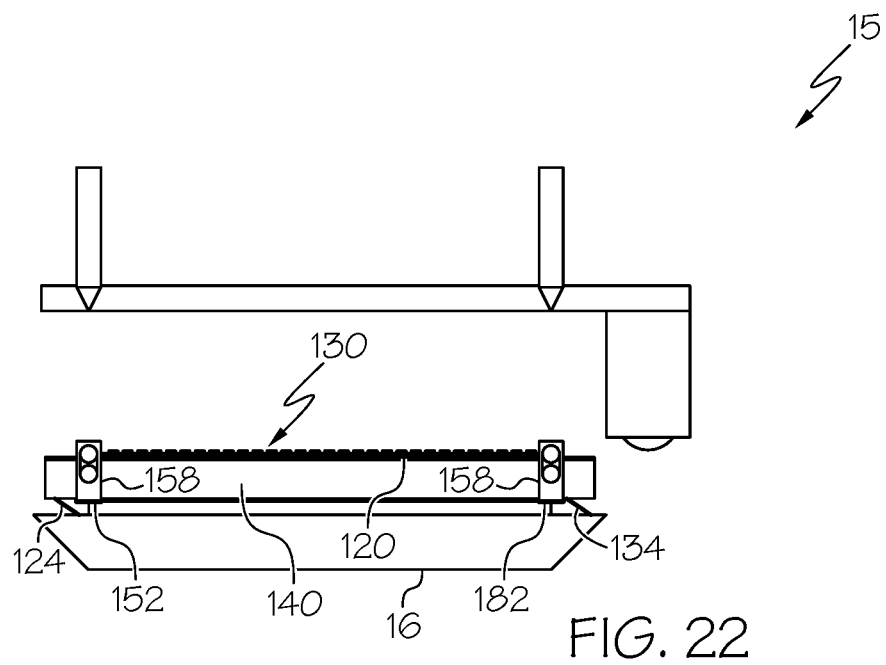
FIG. 22 is a front view of a second example of an automated multi-ply structure trimming system in a ninth configuration.

With continued reference to FIGS. 13-23, and particularly FIG. 22, in some examples, the system (15) further comprises a scrap bin (16) positioned to receive first scrap (124) generated from the first ply (120) and/or second ply (130). In some examples, the system (15) comprises no scrap bin (16), one scrap bin (16), two scrap bins (16), or more scrap bins (16). A scrap bin (16) is adapted and/or positioned to receive discarded first scrap (124) from the first ply (120) or to receive discarded second scrap (134) generated from the second ply (130), or to receive discarded scrap from another ply, or a combination thereof.

With continued reference to FIGS. 13-23, in some examples, the system (15) further comprises one or more automated actuators. In some examples, the system (15) comprises an automated actuator (162) operationally associated with the platen (140) and adapted to move the platen (140); an automated actuator (162) operationally associated with the laminator (170) and adapted to move the laminator (170); an automated actuator (162A) operationally associated with the cutting board (152) and adapted to move the cutting board (152); an automated actuator (162A) operationally associated with the second cutting board (182) and adapted to move the second cutting board (182); or some combination thereof. In some examples, the system (15) comprises an automated actuator (162B) operationally associated with the cutting tool (160), such that the automated actuator (162B) is adapted to move the cutting tool (160) to perform a cutting operation. In some examples, the system (15) comprises an automated actuator (162B) operationally associated with the second cutting tool (169), such that the automated actuator (162B) is adapted to move the second cutting tool (169) to perform a cutting operation. In some examples, an automated actuator (162B) comprises the trim gantry (144) and trim head (145). In certain aspects, an actuator (162) is electromagnetic, pneumatic, hydraulic, or otherwise as chosen with good engineering judgment.

In the second non-limiting example shown in FIGS. 13-23, the system (15) further comprises a second cutting board (182) moveable relative to the platen and positionable between the first ply (120) and the second ply (130). For instance, FIGS. 13-23 illustrate a second example of an automated multi-ply structure trimming system (15) that includes a first cutting board (152) and a second cutting board (182). As shown in FIGS. 13-23, in some examples, the system (15) further comprises a second cutting board (182) moveable relative to the platen (140) and positionable between the first ply (120) and the second ply (130). The second cutting board (182) is moveable relative to the platen (140) about an axis of rotation different from the axis of rotation (156). In some non-limiting examples, the second cutting board (182) is moveable relative to the platen (140) by translation, or by some combination of translation and rotation. In some non-limiting examples, the axis of rotation of the second cutting board (182) is perpendicular to at least one imaginary vector (12) normal to the second cutting board (182). In some non-limiting examples, the axis of rotation of the second cutting board (182) is parallel to at least one imaginary vector normal to the second cutting board (182). In some examples, the axis of rotation of the second cutting board (182) is fixed in space relative to the second cutting board (182), but this is not always the case in every example. The portion of the subjacent component or material protected by the cutting board (152), or the second cutting board (182), or another cutting board, is referred to herein as the protected portion (20).

With continued reference to FIGS. 13-23 and with particular reference to FIGS. 18A-C, in the second non-limiting example, first cutting board (152) is adapted to rotate about axis of rotation (156) and to translate either vertically or horizontally by sliding slot (158) with respect to the axis of rotation (156). These adaptations permit the first cutting board (152) to move from a first upright orientation (152A) by translating upwards to a second upright position (152B) and to move from the second upright position (152B) by rotating around the axis of rotation (156) to horizontal orientation (152C). This latter rotation could continue if needed to dump first scrap (124) from the cutting board (152) into a scrap bin (16) as shown in FIG. 22. Similarly, these same adaptations permit the first cutting board (152) to move from a horizontal orientation (152C) by rotating around the axis of rotation (156) around platen (140) to the second upright position (152B), and to move from the second upright position (152B) by translating downwards to the first upright orientation (152A).

With continued reference to FIGS. 13-23 and with particular reference to FIGS. 18A-C, in the second non-limiting example, second cutting board (182) is adapted to rotate about second axis of rotation (186) and to translate either vertically or horizontally by sliding slot (158) with respect to the second axis of rotation (186). These adaptations permit the second cutting board (182) to move from a first upright orientation (182A) by translating upwards to a second upright position (182B) and to move from the second upright position (182B) by rotating around the second axis of rotation (186) to horizontal orientation (182C). This latter rotation could continue if needed to dump second scrap (134) from the second cutting board (182) into a scrap bin (16) as shown in FIG. 22. Similarly, these same adaptations permit the second cutting board (182) to move from a horizontal orientation (182C) by rotating around the second axis of rotation (186) to the second upright position (182B), and to move from the second upright position (182B) by translating downwards to the first upright orientation (182A).

With reference now to FIGS. 13-23, in some non-limiting examples system (15) the system further comprises a second cutting tool (169) having properties and adaptations similar or identical to that of the cutting tool (160). As shown in FIG. 13-23 in some non-limiting examples a first cutting tool (160), or a second cutting tool (169), or both, may be operationally engaged with a trim head (145) and each trim head (145) may be movable over the needed cutting region by a trim gantry (144). As shown in FIG. 13, a trim gantry (144) may be an automated gantry or cartesian robot, but in other equally acceptable examples a trim gantry (144) is another kind of automated actuator or robot.

With reference to FIGS. 1-10 and 24, further provided is a first automated method (1000) for trimming a multi-ply structure (110) comprising at least a first ply (120) and a second ply (130). The first automated method (1000) optionally includes, at block 1100, moving the platen (140) into a workstation (10). The first automated method (1000) includes, at block 1200, applying the first ply (120) over a platen (140). The first automated method (1000) optionally further includes, at block 1300, positioning the cutting board (152) over a protected portion (20) of the film (142). The first automated method (1000) optionally further includes, at block 1400, cutting the superjacent portion (40) of the first ply (120) to generate a scrap (124) from the first ply. The first automated method (1000) optionally further includes, at block 1500, discarding the first scrap (124) from the first ply. The first automated method (1000) further includes, at block 1600, positioning a cutting board (152) over a protected portion (20) of the first ply (120). The first automated method (1000) further includes, at block 1700, applying the second ply (130) over the platen (140) such that the cutting board (152) is between the protected portion (20) of the first ply (120) and a superjacent portion (40) of the second ply (130). The first automated method (1000) further includes, at block 1800, cutting the superjacent portion (40) of the second ply (130). The first automated method (1000) may optionally further include, at block 1900, sliding the swing arm (154) with respect to the axis of rotation (156) using a slot (158). The first automated method (1000) may optionally further include, at block 1950, discarding the second scrap (134) from the second ply. The first automated method (1000) may optionally further include, at block 1960, positioning a second cutting board (182) over a second protected portion (24) of the first ply (120) such that the second cutting board (182) is between the second protected portion (24) of the first ply (120) and a second superjacent portion (44) of the second ply (130). The first automated method (1000) may optionally further include, at block 1970, cutting the second superjacent portion (44) of the second ply (130).

With continued reference to FIGS. 1-10, in certain examples, the first automated method further comprises, prior to the applying the first ply (120), positioning a film (142) over the platen (140). For instance, FIG. 1 illustrates film (142) positioned over the platen (140).

Figure 2:
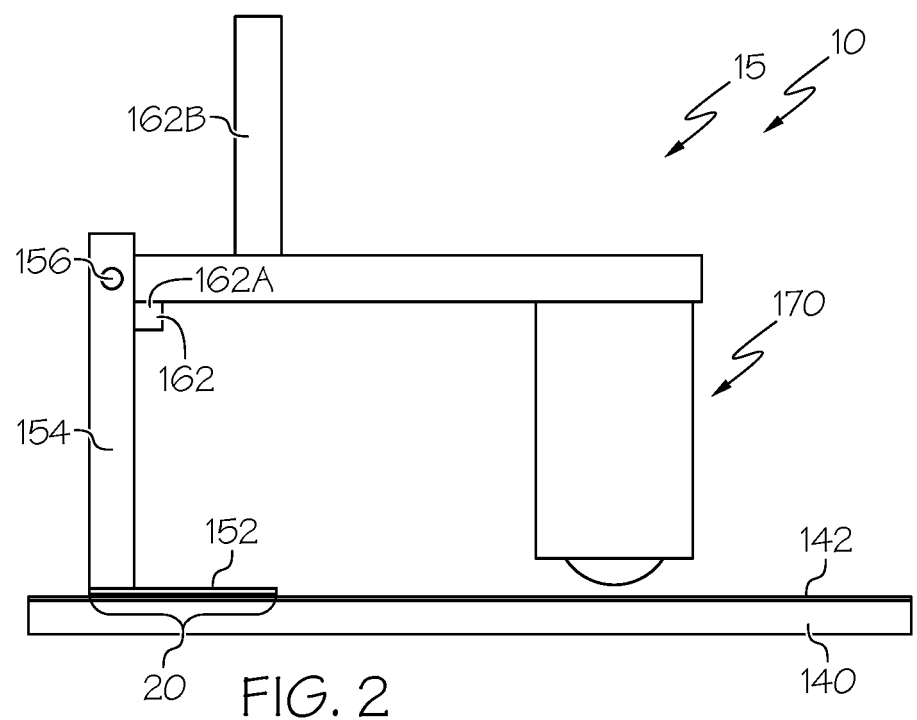
FIG. 2 is a front view of the first example of an automated multi-ply structure trimming system in a second configuration.

Some non-limiting forms of this latter first automated method further comprise, prior to the applying the first ply (120), positioning the cutting board (152) over a protected portion (20) of the film (142). For instance, FIG. 2 illustrates prior to the applying the first ply (120), positioning the cutting board (152) over a protected portion (20) of the film (142).

Figure 3:
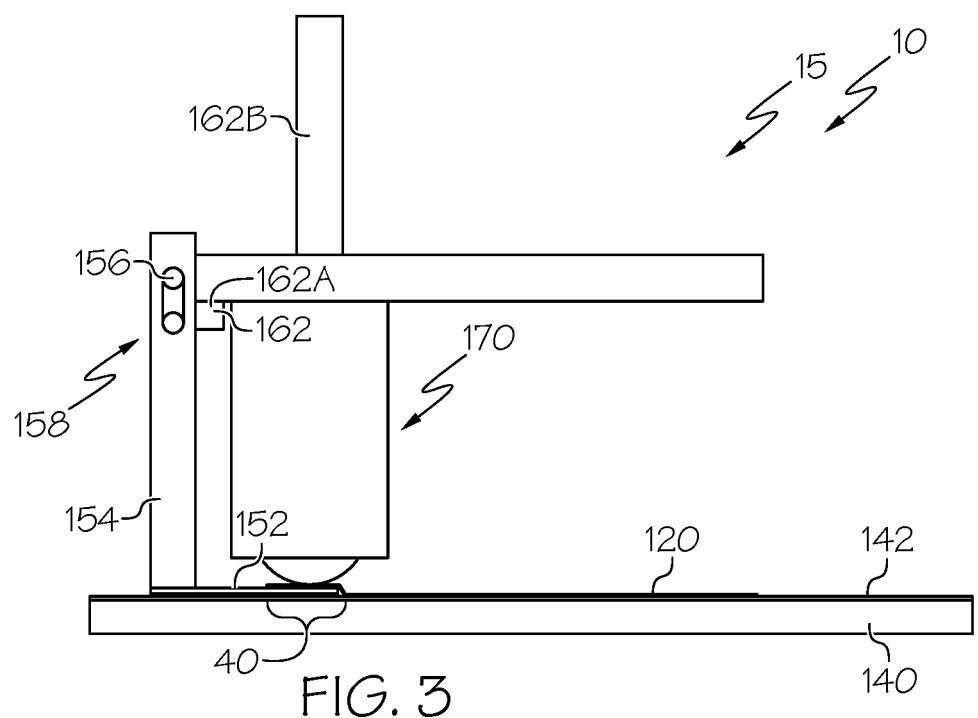
FIG. 3 is a front view of the first example of an automated multi-ply structure trimming system in a third configuration and with a further optional modification to show a slot.

In some non-limiting forms of this latter first automated method, applying the first ply (120) is performed such that the cutting board (152) is between the protected portion (20) of the film (142) and a superjacent portion (40) of the first ply (120). For instance, FIG. 3 illustrates applying the first ply (120) such that the cutting board (152) is between the protected portion (20) of the film (142) and a superjacent portion (40) of the first ply (120).

Figure 4:
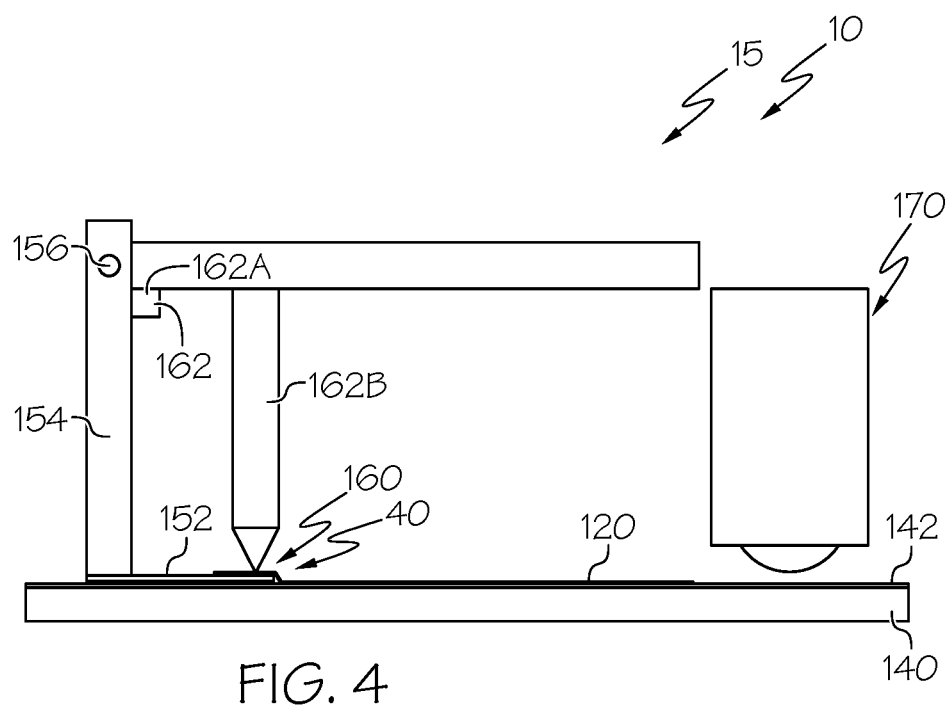
FIG. 4 is a front view of the first example of an automated multi-ply structure trimming system in a fourth configuration.

In some non-limiting forms of this latter first automated method, cutting the superjacent portion (40) of the first ply (120) to generate a first scrap (124) from the first ply is performed subsequent to the applying the first ply (120) over the platen (140). In some examples, this latter cutting is performed prior to the positioning the cutting board (152) over the protected portion (20) of the first ply (120). For instance, FIG. 4 illustrates cutting the superjacent portion (40) of the first ply (120) to generate a first scrap (124) from the first ply is performed subsequent to the applying the first ply (120) over the platen (140) and prior to the positioning the cutting board (152) over the protected portion (20) of the first ply (120).

Figure 5:
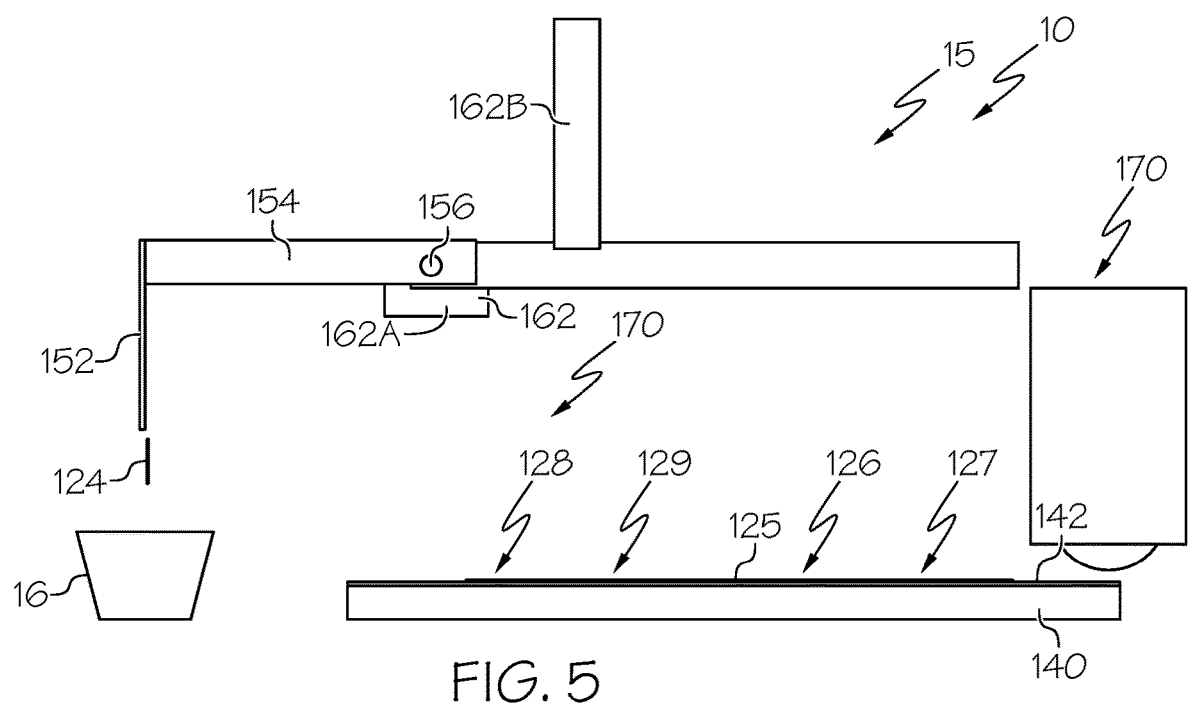
FIG. 5 is a front view of the first example of an automated multi-ply structure trimming system in a fifth configuration.

In some non-limiting forms of this latter first automated method, discarding the first scrap (124) from the first ply is performed subsequent to the cutting the superjacent portion (40) of the first ply (120). In some examples, this latter discarding is performed prior to the positioning the cutting board (152) over the protected portion (20) of the first ply (120). For instance, FIG. 5 illustrates discarding the first scrap (124) from the first ply subsequent to the cutting the superjacent portion (40) of the first ply (120) and prior to the positioning the cutting board (152) over the protected portion (20) of the first ply (120).

Figure 6:
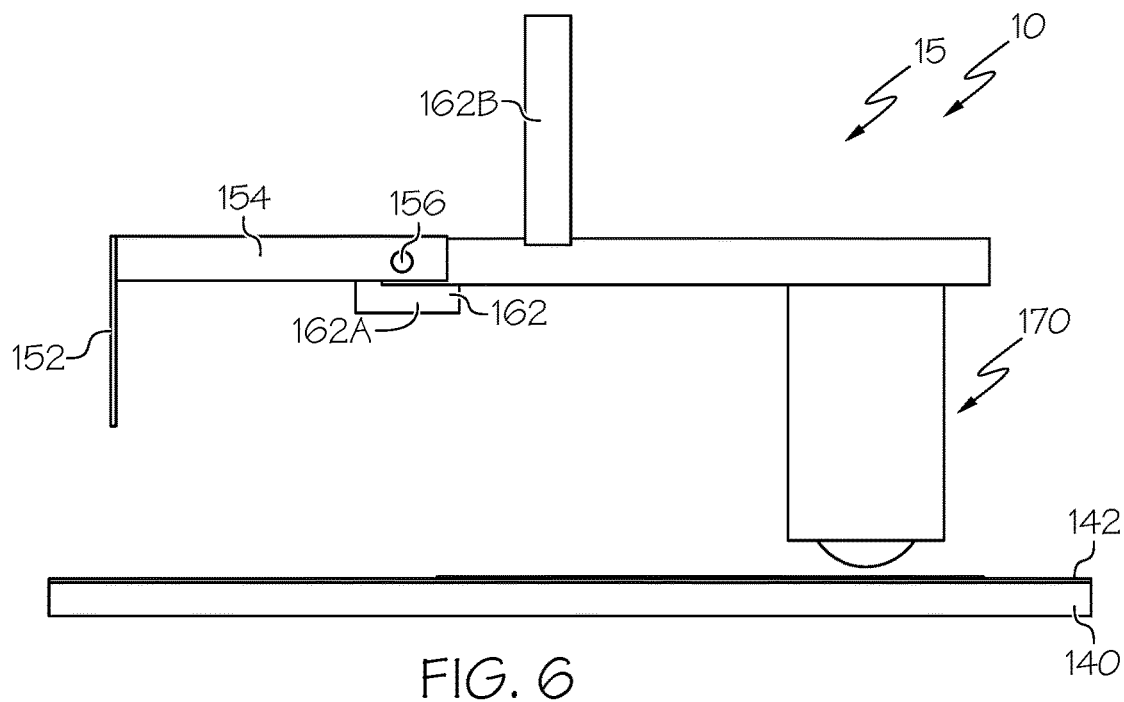
FIG. 6 is a front view of the first example of an automated multi-ply structure trimming system in a sixth configuration.
Figure 7:
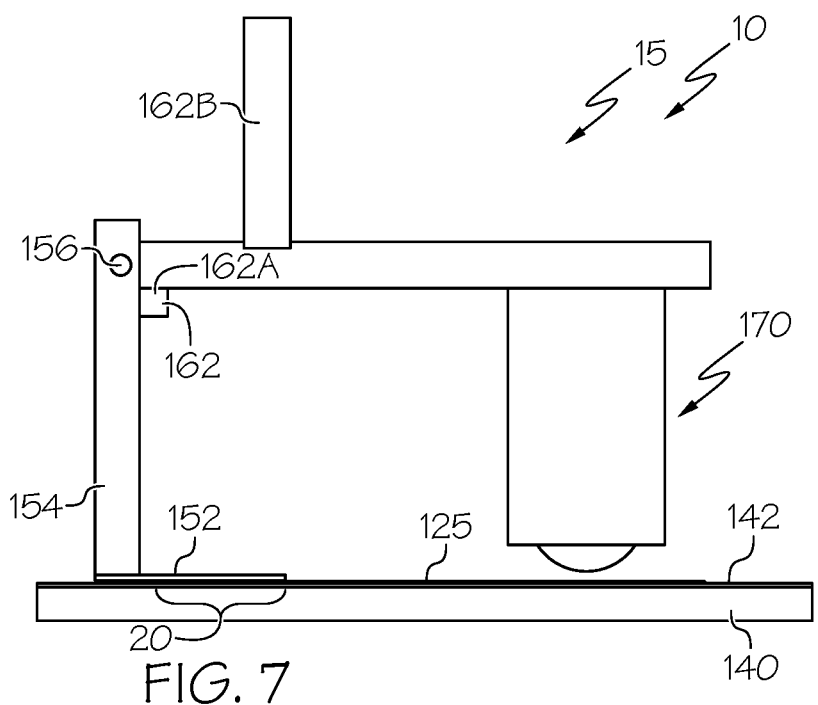
FIG. 7 is a front view of the first example of an automated multi-ply structure trimming system in a seventh configuration.

In some non-limiting forms of this latter first automated method, positioning a cutting board (152) over a protected portion (20) of the first ply (120) is performed by rotating the cutting board 152 about axis of rotation 156. For instance, FIGS. 6-7 illustrates positioning a cutting board (152) over a protected portion (20) of the first ply (120) is performed by rotating the cutting board 152 about axis of rotation 156.

Figure 8:
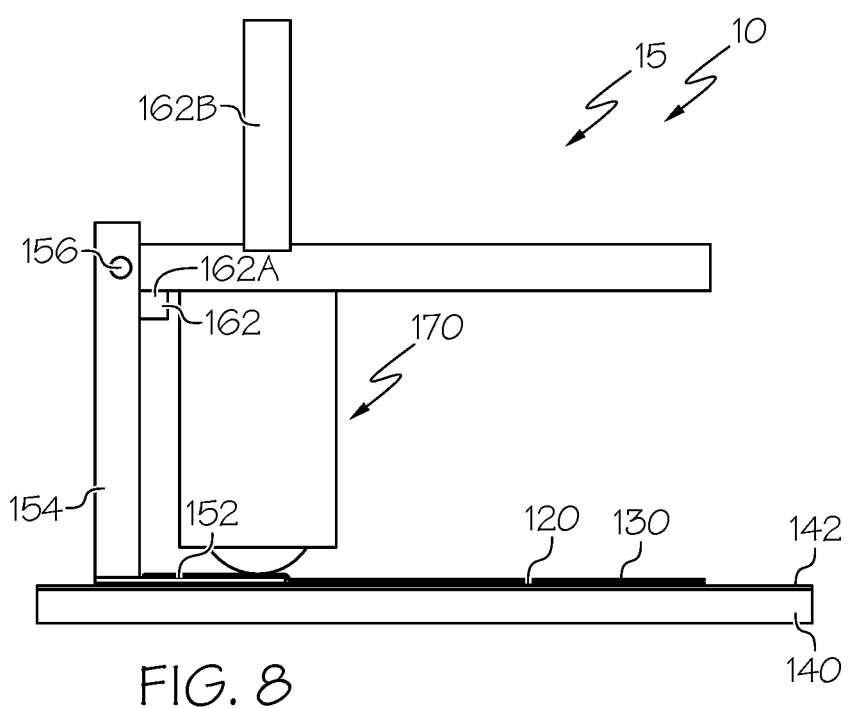
FIG. 8 is a front view of the first example of an automated multi-ply structure trimming system in an eighth configuration.

In some non-limiting forms of this latter first automated method, applying the second ply (130) over the platen (140) is performed such that the cutting board (152) is between the protected portion (20) of the first ply (120) and a superjacent portion (40) of the second ply (130). For instance, FIGS. 7-8 illustrate applying the second ply (130) over the platen (140) is performed such that the cutting board (152) is between the protected portion (20) of the first ply (120) and a superjacent portion (40) of the second ply (130).

Figure 9:
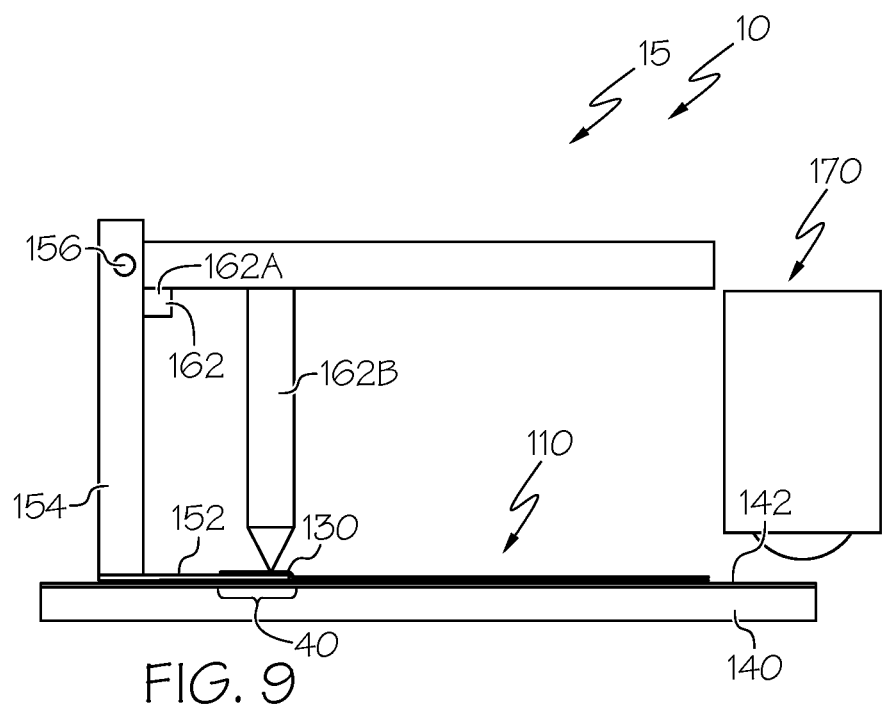
FIG. 9 is a front view of the first example of an automated multi-ply structure trimming system in a ninth configuration.

In some non-limiting forms of this latter first automated method, cutting the superjacent portion (40) of the second ply (130) is performed. For instance, FIG. 9 illustrates cutting the superjacent portion (40) of the second ply (130).

In some non-limiting forms of this latter first automated method, discarding the second scrap (134) from the second ply is performed. For instance, FIG. 10 illustrates discarding the second scrap (134) from the second ply.

Some but not all non-limiting forms of this latter automated method further comprise, subsequent to the applying the first ply (120) over the platen (140), and prior to the positioning the cutting board (152) over the protected portion (20) of the first ply (120), cutting the superjacent portion (40) of the first ply (120) to generate first scrap (124) from the first ply. Some non-limiting forms of this latter automated method further comprise, subsequent to the cutting the superjacent portion (40) of the first ply (120), and prior to the positioning the cutting board (152) over the protected portion (20) of the first ply (120), discarding the first scrap (124) from the first ply. In some non-limiting forms of this latter automated method, the cutting the superjacent portion (40) of the first ply (120) comprises moving a cutting tool (160) relative to the first ply (120), and the cutting the superjacent portion (40) of the second ply (130) comprises moving the cutting tool (160) relative to the second ply (130). As noted above, in some examples, the cutting tool (160) is operationally engaged with an automated actuator (162B) and/or comprises at least one of an ultrasonic knife (163), a mechanical knife (165), and a wheel cutter (167).

With continued reference to FIGS. 1-10, in some non-limiting forms of the first automated method, the cutting the superjacent portion (40) of the second ply (130) generates a second scrap (134) from the second ply. Some non-limiting forms of this latter automated method further comprise, discarding the second scrap (134) from the second ply.

With continued reference to FIGS. 1-10, in some non-limiting forms of the first automated method, applying the first ply (120) over the platen (140) comprises using a laminator (170) moveable with respect to the platen (140).

With continued reference to FIGS. 1-10, and with reference to FIGS. 12A and 12B, in some non-limiting forms of the first automated method, the first ply (120) comprises a first composite material (125). In some non-limiting forms of this latter automated method, the first composite material (125) comprises a first polymer matrix (126) and a first reinforcing fiber (128) (see FIG. 5). In some non-limiting forms of this latter automated method, the first polymer matrix (126) comprises a thermoset resin (127), or the first reinforcing fiber (128) comprises a carbon fiber (129), or both (see FIG. 5). In some non-limiting examples, a first polymer matrix (126) comprises a thermoplastic resin, a thermoset resin (127), or some combination thereof. In some non-limiting examples, a thermoset resin (127) comprises epoxy. In some non-limiting examples, a first reinforcing fiber (128) comprises fiberglass, carbon fiber, steel fiber, aramid, or some combination thereof.

With continued reference to FIGS. 1-10, and with reference to FIGS. 12A and 12B, in some non-limiting forms of the first automated method, the first ply (120) comprises a first composite material (125), and the second ply (130) comprises a second composite material (135). In some non-limiting forms of this latter automated method, the second composite material (135) comprises a second polymer matrix (136) and a second reinforcing fiber (138). In some non-limiting forms of this latter automated method, the second polymer matrix (136) comprises a thermoset resin (127), or the second reinforcing fiber (138) comprises a carbon fiber (129), or both. In some non-limiting forms, the second composite material (135) is substantially the same as the first composite material (125). Composite materials are to be considered substantially the same for these purposes if the differences between them are so minor as to permit the materials to be interchangeable for these purposes. In some non-limiting examples, a second polymer matrix (136) comprises a thermoplastic resin, a thermoset resin (127), or some combination thereof. In some non-limiting examples, a second reinforcing fiber (138) comprises fiberglass, carbon fiber, steel fiber, aramid, or some combination thereof.

With continued reference to FIGS. 1-10, in some non-limiting forms of the first automated method, positioning the cutting board (152) over the protected portion (20) of the first ply (120) comprises positioning the cutting board (152) in direct contact with the protected portion (20) of the first ply (120). In other non-limiting examples, positioning the cutting board (152) over the protected portion (20) of the first ply (120) comprises positioning the cutting board (152) in indirect contact with the protected portion (20) of the first ply (120), such as in direct contact with an intermediary material between the cutting board (152) and the protected portion (20) of the first ply (120), or offset from the protected portion (20) of the first ply (120) by a gap.

With continued reference to FIGS. 1-10, in some non-limiting forms of the first automated method, the cutting board (152) is connected to a swing arm (154), and the positioning the cutting board (152) over the protected portion (20) of the first ply (120) comprises rotating the swing arm (154) about an axis of rotation (156). In some non-limiting forms of this latter automated method, rotating the swing arm (154) is effected by an automated actuator (162A), or the method also comprises sliding the swing arm (154) with respect to the axis of rotation (156) using a slot (158), or both.

With continued reference to FIGS. 1-10, in some non-limiting forms of the first automated method, applying the second ply (130) over the platen (140) comprises using a laminator (170) moveable or stationary with respect to the platen (140).

With continued reference to FIGS. 1-10, some non-limiting forms of the first automated method further comprise moving the platen (140) into a workstation (10), or out of a workstation (10), or from a workstation (10) to another workstation (10).

With further reference to FIGS. 14-23, some non-limiting forms of the second automated method further comprise positioning a second cutting board (182) over a second protected portion (24) of the first ply (120) such that the second cutting board (182) is between the second protected portion (24) of the first ply (120) and a second superjacent portion (44) of the second ply (130); and cutting the second superjacent portion (44) of the second ply (130). In some non-limiting forms of this latter automated method, cutting the second superjacent portion (44) of the second ply (130) comprises moving a second cutting tool (169) relative to the second ply (130).

With further reference to FIG. 13, in some non-limiting forms of the second automated method an automated actuator (162A) is operationally associated with the second cutting board (182) and adapted to move the second cutting board (182).

In some non-limiting forms of the second automated method, the system (15) comprises an automated actuator (162B) operationally associated with a second cutting tool (169) such that the automated actuator (162B) is adapted to move the second cutting tool (169) to perform a cutting operation. In some non-limiting forms of the second automated method the automated actuator (162B) operationally associated with a second cutting tool (169) is trim gantry (144) or comprises the trim gantry (144) and the trim head (145).

As shown in FIGS. 1-10, FIGS. 14-23, and 25 further provided is a second automated method (2000) for trimming a multi-ply structure (110) comprising at least a first ply (120) comprising a first composite material (125) and a second ply (130) comprising a second composite material (135). The second automated method (2000) includes, at block 2100 positioning a film (142) over a platen (140). The second automated method (2000) further includes, at block 2200, positioning a cutting board (152) over a protected portion (20) of the film (142). The second automated method (2000) further includes, at block 2300, applying with a laminator (170) the first ply (120) over the platen (140) such that the cutting board (152) is between the protected portion (20) of the film (142) and a superjacent portion (40) of the first ply (120). The second automated method (2000) further includes, at block 2400, cutting the superjacent portion (40) of the first ply (120). The second automated method (2000) further includes, at block 2500, positioning the cutting board (152) over a protected portion (20) of the first ply (120). The second automated method (2000) further includes, at block 2600, applying with the laminator (170) the second ply (130) over the platen (140) such that the cutting board (152) is between the protected portion (20) of the first ply (120) and a superjacent portion (40) of the second ply (130). The second automated method (2000) further includes, at block 2700, cutting the superjacent portion (40) of the second ply (130).

With continued reference to FIGS. 13-23, in certain examples, the second automated method comprises, prior to the applying the first ply (120), positioning a film (142) over the platen (140). For instance, FIG. 14 illustrates film (142) positioned over the platen (140).

Some non-limiting forms of this latter second automated method further comprise, prior to the applying the first ply (120), positioning the cutting board (152) over a protected portion (20) of the film (142). For instance, FIG. 14 illustrates prior to the applying the first ply (120), positioning the cutting board (152) over a protected portion (20) of the film (142). FIG. 14 also illustrates prior to the applying the first ply (120), positioning the second cutting board (182) over a protected portion (20) of the film (142).

In some non-limiting forms of this latter second automated method, applying the first ply (120) is performed such that the cutting board (152) and the second cutting board (182) are each between the protected portion (20) of the film (142) and a superjacent portion (40) of the first ply (120). For instance, FIG. 15 illustrates applying the first ply (120) such that the cutting board (152) and the second cutting board (182) are each between the protected portion (20) of the film (142) and a superjacent portion (40) of the first ply (120).

Figure 16:
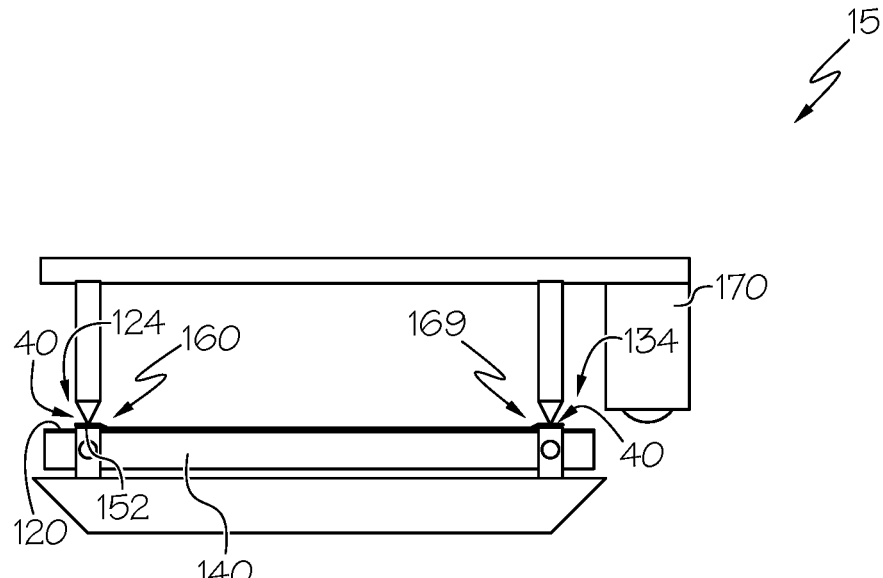
FIG. 16 is a front view of a second example of an automated multi-ply structure trimming system in a fourth configuration.

In some non-limiting forms of this latter second automated method, cutting the superjacent portion (40) of the first ply (120) to generate a first scrap (124) from the first ply is performed subsequent to the applying the first ply (120) over the platen (140). In some examples, this latter cutting is performed prior to the positioning either the cutting board (152) or the second cutting board (182) over the protected portion (20) of the first ply (120). For instance, FIG. 16 illustrates cutting the superjacent portion (40) of the first ply (120) to generate a first scrap (124) and a second scrap (134) from the first ply is performed subsequent to the applying the first ply (120) over the platen (140) and prior to the positioning the cutting board (152) over the protected portion (20) of the first ply (120).

Figure 17:
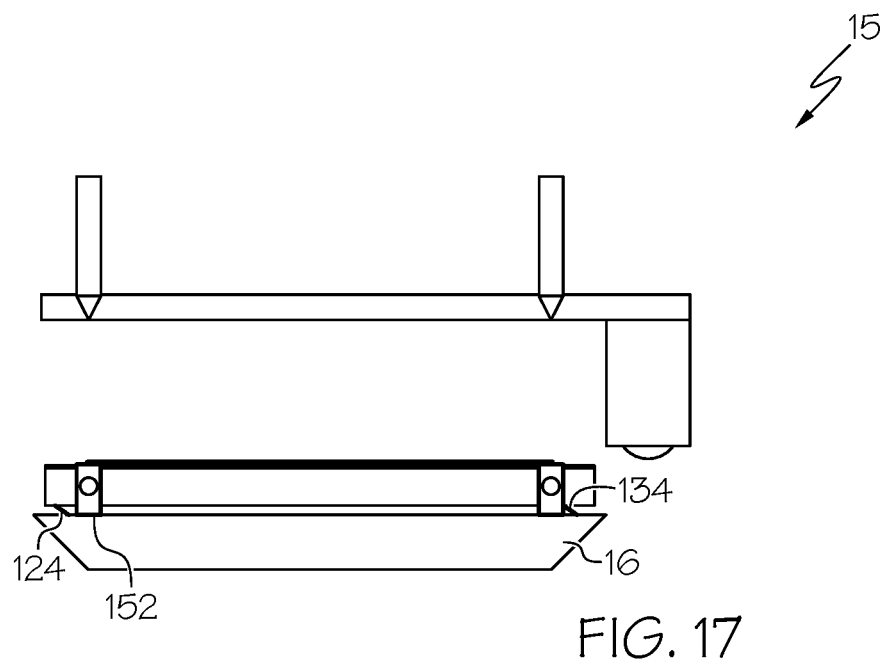
FIG. 17 is a front view of a second example of an automated multi-ply structure trimming system in a fifth configuration.
Figure 19:
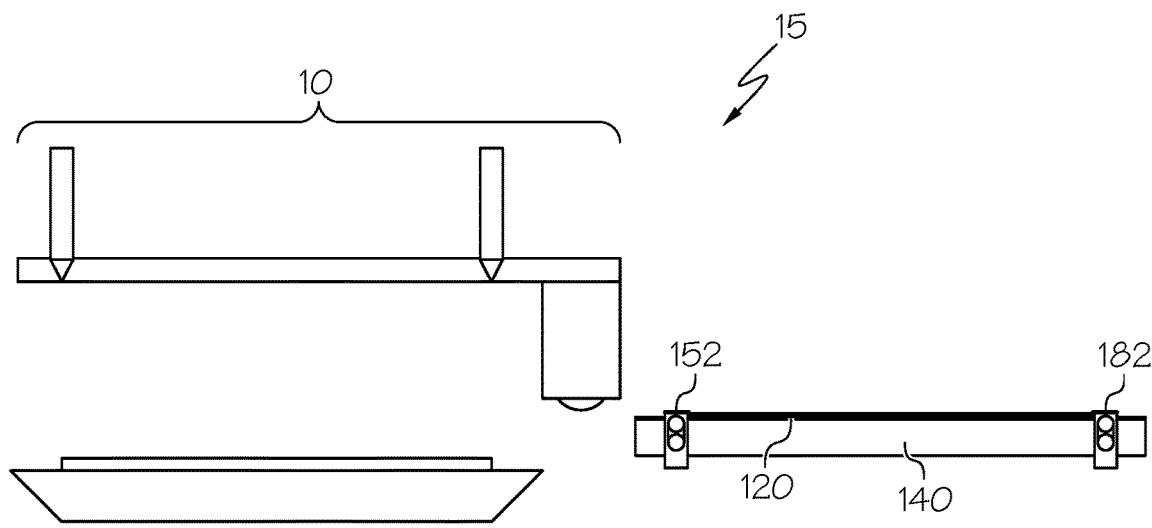
FIG. 19 is a front view of a second example of an automated multi-ply structure trimming system in a sixth configuration.
Figure 20:
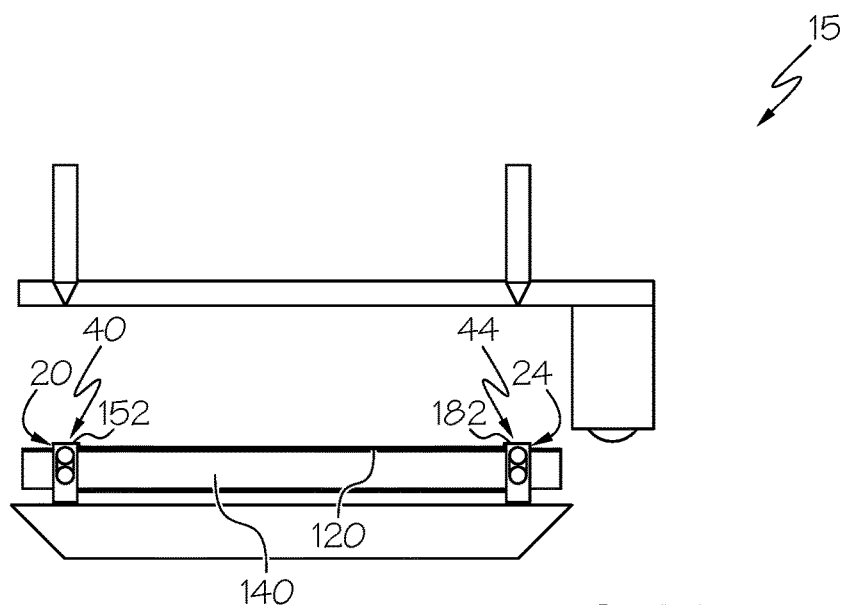
FIG. 20 is a front view of a second example of an automated multi-ply structure trimming system in a seventh configuration.

In some non-limiting forms of this latter second automated method, discarding the first scrap (124) from the first ply and a second scrap (134) is performed subsequent to the cutting the superjacent portion (40) of the first ply (120). In some examples, this latter discarding is performed prior to the positioning the cutting board (152) over the protected portion (20) of the first ply (120). For instance, FIG. 17 illustrates discarding the first scrap (124) from the first ply and a second scrap (134) subsequent to the cutting the superjacent portion (40) of the first ply (120) and prior to the positioning the cutting board (152) over the protected portion (20) of the first ply (120).

In some non-limiting forms of this latter second automated method, positioning the cutting board (152) and the second cutting board (182) is performed by rotating the cutting board (152) about first axis of rotation (156) and by rotating the second cutting board (182) about second axis of rotation (186). For instance, FIGS. 18A-C illustrates positioning the cutting board (152) and the second cutting board (182) is performed by rotating the cutting board (152) about first axis of rotation 156 and by rotating the second cutting board (182) about second axis of rotation (186).

In some non-limiting forms of this latter second automated method, applying the second ply (130) over the platen (140) is performed such that the cutting board (152) and the second cutting board (182) are each between the protected portion (20) of the first ply (120) and a superjacent portion (40) of the second ply (130). For instance, FIGS. 19-22 illustrate applying the second ply (130) (see FIG. 21) over the platen (140) is performed such that the cutting board (152) and the second cutting board (182) are each between the protected portion (20) of the first ply (120) and a superjacent portion (40) of the second ply (130).

In some non-limiting forms of this latter second automated method, cutting the superjacent portion (40) of the second ply (130) is performed. For instance, FIG. 21 illustrates cutting the superjacent portion (40) of the second ply (130).

In some non-limiting forms of this latter second automated method, discarding the first scrap (124) and the second scrap (134) from the second ply. For instance, FIG. 22 illustrates discarding the second scrap (134) from the second ply.

Figure 23:
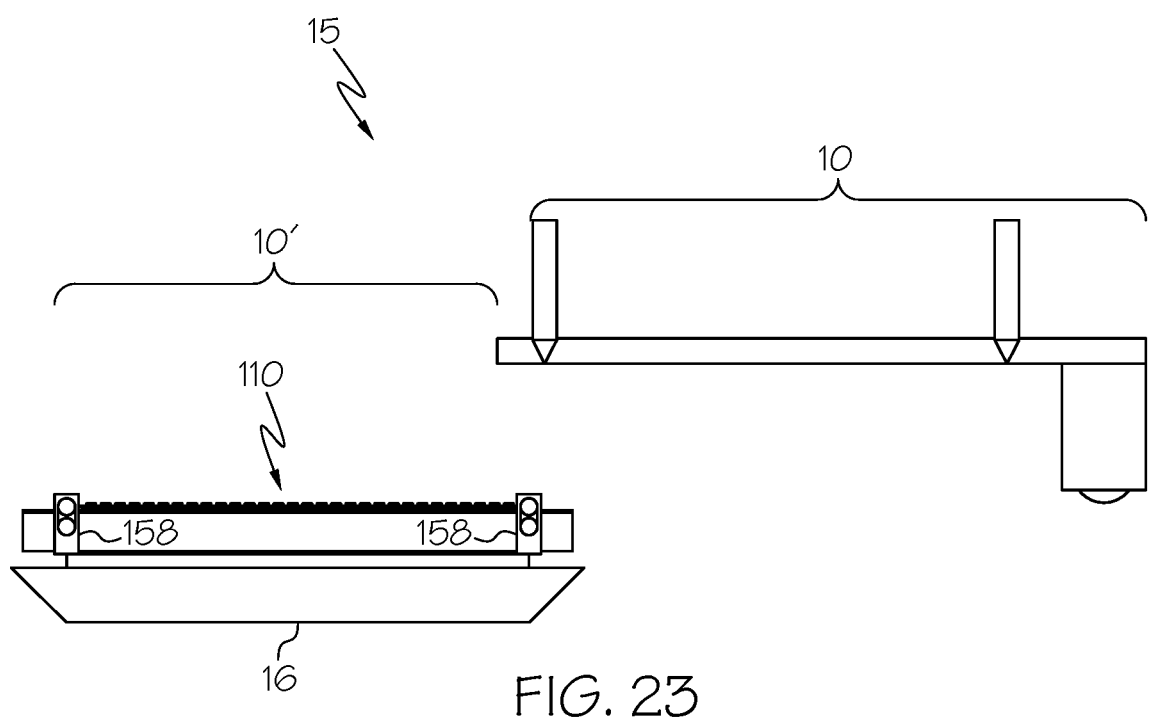
FIG. 23 is a front view of a second example of an automated multi-ply structure trimming system in a tenth configuration.
Figure 24:
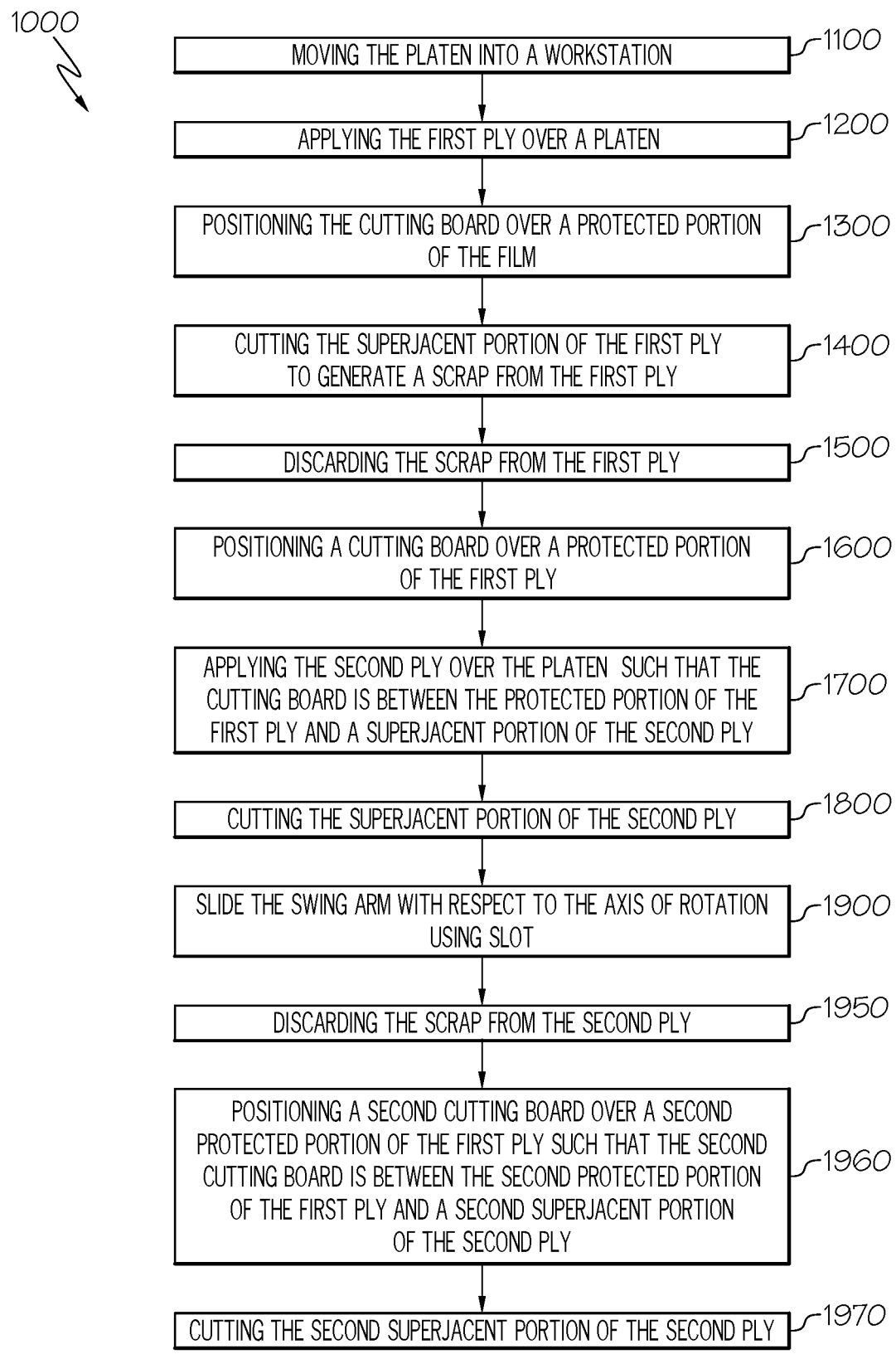
FIG. 24 is a block diagram of a first method.
Figure 25:
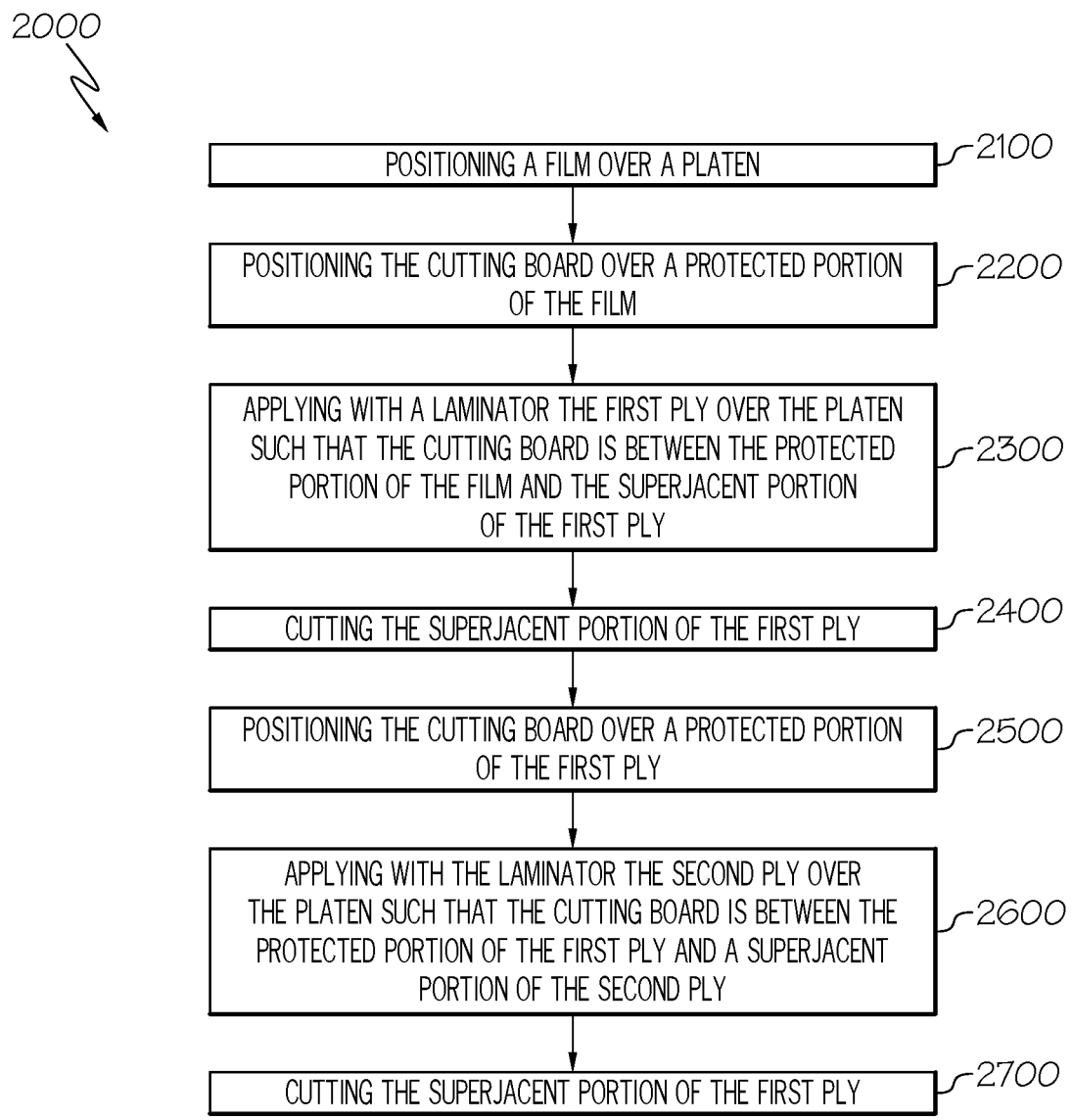
FIG. 25 is a block diagram of a second method.

With reference now to FIG. 23, in some non-limiting examples, the platen (140) is movable among multiple workstations (10), transports a ply or a multi-ply structure (110) from a workstation (10) to another workstation (10'), and supports a ply or a multi-ply structure (110) in a workstation (10) while operations are performed thereon.

Although various examples of the disclosed apparatus and methods have been shown and described, modifications may occur to those skilled in the art upon reading the specification. The present application includes such modifications and is limited only by the scope of the claims.

What is claimed is:

1. An automated method for trimming a multi-ply structure comprising at least a first ply and a second ply, the method comprising:
applying the first ply over a platen;
positioning a cutting board over a protected portion of the first ply by automatically rotationally moving the cutting board about an axis of rotation and linearly moving the cutting board perpendicular to the axis of rotation relative to the platen;
applying the second ply over the platen such that the cutting board is between the protected portion of the first ply and a superjacent portion of the second ply; and
cutting the superjacent portion of the second ply.

2. The automated method of claim 1 further comprising, prior to the applying the first ply, positioning a film over the platen.

3. The automated method of claim 2 further comprising, prior to the applying the first ply, positioning the cutting board over a protected portion of the film.

4. The automated method of claim 3 wherein the applying the first ply is performed such that the cutting board is between the protected portion of the film and a superjacent portion of the first ply.

5. The automated method of claim 4 further comprising, subsequent to the applying the first ply over the platen, and prior to the positioning the cutting board over the protected portion of the first ply, cutting the superjacent portion of the first ply to generate a scrap from the first ply.

6. The automated method of claim 5 further comprising, subsequent to the cutting the superjacent portion of the first ply, and prior to the positioning of the cutting board over the protected portion of the first ply, discarding the scrap from the first ply.

7. The automated method of claim 5 wherein the cutting of the superjacent portion of the first ply comprises moving a cutting tool relative to the first ply, and wherein the cutting the superjacent portion of the second ply comprises moving the cutting tool relative to the second ply.

8. The automated method of claim 1 wherein the applying the first ply over the platen comprises using a laminator moveable with respect to the platen.

9. The automated method of claim 1 wherein the first ply comprises a first composite material.

10. The automated method of claim 9 wherein the second ply comprises a second composite material.

11. The automated method of claim 1 wherein the positioning the cutting board over the protected portion of the first ply comprises positioning the cutting board in direct contact with the protected portion of the first ply.

12. The automated method of claim 1 wherein the cutting board is connected to a swing arm, and wherein the cutting board is positioned over the protected portion of the first ply by automatically rotating the swing arm about the axis of rotation.

13. The automated method of claim 12 wherein the cutting board is positioned over the protected portion of the first ply by automatically sliding the swing arm with respect to the axis of rotation using a slot.

14. The automated method of claim 1 wherein the applying the second ply over the platen comprises using a laminator moveable with respect to the platen.

15. The automated method of claim 1 further comprising:
positioning a second cutting board over a second protected portion of the first ply such that the second cutting board is between the second protected portion of the first ply and a second superjacent portion of the second ply; and
cutting the second superjacent portion of the second ply.

16. The automated method of claim 15 wherein the cutting the second superjacent portion of the second ply comprises moving a second cutting tool relative to the second ply.

17. An automated method for trimming a multi-ply structure comprising at least a first ply comprising a first composite material and a second ply comprising a second composite material, the method comprising:
positioning a film over a platen;
positioning a cutting board over a protected portion of the film;
applying with a laminator the first ply over the platen such that the cutting board is between the protected portion of the film and a superjacent portion of the first ply;
cutting the superjacent portion of the first ply;
positioning the cutting board over a protected portion of the first ply;
applying with the laminator the second ply over the platen such that the cutting board is between the protected portion of the first ply and a superjacent portion of the second ply; and
cutting the superjacent portion of the second ply.

18. An automated multi-ply structure trimming system comprising
a platen;
a laminator movable relative to the platen to apply at least a first ply and a second ply over the platen;
a swing arm having an axis of rotation;
a cutting board coupled to the swing arm and rotationally moveable relative to the platen about the axis of rotation and positionable between the first ply and the second ply; and
a cutting tool movable with respect to the platen to cut the second ply.

19. The system of claim 18 wherein the cutting board is linearly moveable in a direction perpendicular to the axis of rotation relative to the platen.

20. The system of claim 18 further comprising an automated actuator operationally associated with the cutting tool.

* * * * *